United States Patent
Lilley et al.

(10) Patent No.: US 9,523,514 B2
(45) Date of Patent: Dec. 20, 2016

(54) SELECTIVE WATER TEMPERATURE COMPONENT FOR USE WITH WATER TREATMENT SYSTEMS

(71) Applicant: Access Business Group International LLC, Ada, MI (US)

(72) Inventors: Matthew J. Lilley, Walker, MI (US); Michael E. Miles, Grand Rapids, MI (US); Terry L. Lautzenheiser, Nunica, MI (US); Kevin G. King, Caledonia, MI (US); Rick G. Good, Rockford, MI (US); Jeffrey A. Shumate, Rockford, MI (US); Ryan Millhouse, Byron Center, MI (US); Karen J. VanderKooi, Walkerville, MI (US)

(73) Assignee: Access Business Group International LLC, Ada, MI (US)

( * ) Notice: Subject to any disclaimer, the term of this patent is extended or adjusted under 35 U.S.C. 154(b) by 596 days.

(21) Appl. No.: 14/032,283

(22) Filed: Sep. 20, 2013

(65) Prior Publication Data

US 2014/0086565 A1  Mar. 27, 2014

Related U.S. Application Data

(60) Provisional application No. 61/704,058, filed on Sep. 21, 2012.

(51) Int. Cl.
*F24H 1/18* (2006.01)
*F24H 1/00* (2006.01)
(Continued)

(52) U.S. Cl.
CPC .............. *F24H 1/0018* (2013.01); *B08B 9/08* (2013.01); *C02F 9/005* (2013.01); *C02F 1/02* (2013.01);
(Continued)

(58) Field of Classification Search
None
See application file for complete search history.

(56) References Cited

U.S. PATENT DOCUMENTS 3,558,852 A * 1/1971 Larenzo ................. B63C 11/28
126/204
4,015,749 A * 4/1977 Arzberger ............. A47J 31/401
222/129.4
(Continued)

FOREIGN PATENT DOCUMENTS

CN 201046065 4/2008
CN 101900416 12/2010
(Continued)

OTHER PUBLICATIONS

International Search Report and Written Opinion for PCT/US2013/060795 mailed Feb. 20, 2014.

*Primary Examiner* — Thor Campbell
(74) *Attorney, Agent, or Firm* — Warner Norcross & Judd LLP

(57) ABSTRACT

A water heating system is provided. The water heating system includes an inlet connectable to a supply of untreated water, supply and return lines connectable to a point-of-use water treatment system, and an output for dispensing a supply of treated and optionally heated water. An internal heating element is adapted to heat the treated water to one of a plurality of pre-selected temperature settings. Temperature control can be achieved by cycling the power applied to the heating element and/or controlling the flow rate of treated water through the heating element. The water heating system includes additional improvements in electrical compatibility, energy consumption, and remote failure detection.

15 Claims, 20 Drawing Sheets

(51) Int. Cl.
   *B08B 9/08*      (2006.01)
   *C02F 9/00*      (2006.01)
   *C02F 1/02*          (2006.01)
   *C02F 1/32*          (2006.01)

(52) U.S. Cl.
   CPC ............ *C02F 1/32* (2013.01); *C02F 2201/007* (2013.01); *C02F 2301/043* (2013.01); *C02F 2303/14* (2013.01)

(56) References Cited

U.S. PATENT DOCUMENTS

| | | | |
|---|---|---|---|
| 4,334,141 A * | 6/1982 | Roller | A47J 31/545 219/505 |
| 4,343,988 A * | 8/1982 | Roller | A47J 31/545 165/165 |
| 4,349,434 A * | 9/1982 | Jaworski | B01D 35/18 210/149 |
| 4,371,777 A * | 2/1983 | Roller | H05B 3/14 219/505 |
| 4,554,688 A | 11/1985 | Puccerella | |
| 4,688,273 A | 8/1987 | Lyng | |
| 4,784,763 A * | 11/1988 | Hambleton | B01D 61/08 210/195.2 |
| 5,113,057 A * | 5/1992 | Tsai | H05B 3/80 219/497 |
| 5,115,491 A | 5/1992 | Perlman et al. | |
| 5,192,004 A * | 3/1993 | Burrows | B67D 3/0009 222/146.1 |
| 5,464,531 A | 11/1995 | Greene | |
| 5,524,820 A | 6/1996 | Regan | |
| 5,588,088 A * | 12/1996 | Flaman | F24D 17/00 122/14.3 |
| 5,701,387 A * | 12/1997 | McGugan | F24D 17/0073 122/13.3 |
| 5,901,635 A | 5/1999 | Lucas et al. | |
| 6,064,801 A | 5/2000 | Stokes et al. | |
| 6,094,524 A * | 7/2000 | Riley | F24H 1/188 392/441 |
| 6,164,189 A | 12/2000 | Anson | |
| 6,207,046 B1 | 3/2001 | Yamashita et al. | |
| 6,212,333 B1 | 4/2001 | Olk et al. | |
| 6,351,603 B2 | 2/2002 | Waithe et al. | |
| 6,439,173 B1 | 8/2002 | Chu | |
| 6,453,938 B1 | 9/2002 | Ebster | |
| 6,514,406 B1 | 2/2003 | Katehis | |
| 6,600,875 B2 | 7/2003 | Kodden et al. | |
| 6,661,968 B2 | 12/2003 | Beaulieu | |
| 6,694,739 B2 | 2/2004 | Beckius et al. | |
| 6,821,414 B1 * | 11/2004 | Johnson | C02F 1/008 210/181 |
| 6,827,142 B2 | 12/2004 | Winkler et al. | |
| 6,835,307 B2 | 12/2004 | Talbert et al. | |
| 7,025,077 B2 | 4/2006 | Vogel | |
| 7,151,892 B2 * | 12/2006 | Li | A47J 31/542 392/479 |
| 7,163,126 B2 | 1/2007 | Knepler | |
| 7,166,216 B2 * | 1/2007 | Woodard, Jr. | A61L 2/10 210/232 |
| 7,190,890 B2 | 3/2007 | Higham et al. | |
| 7,207,189 B2 | 4/2007 | An et al. | |
| 7,324,746 B2 | 1/2008 | Tanaka et al. | |
| 7,330,645 B2 | 2/2008 | Kwon | |
| 7,346,274 B2 | 3/2008 | Bradenbaugh | |
| 7,434,745 B2 | 10/2008 | Deiss et al. | |
| 7,593,789 B2 | 9/2009 | Gougerot et al. | |
| 7,596,306 B2 * | 9/2009 | Greenway | B67D 3/0029 222/146.2 |
| 7,645,381 B2 | 1/2010 | Oranski et al. | |
| 7,870,975 B2 | 1/2011 | Siemer et al. | |
| 7,987,769 B2 * | 8/2011 | Oranski | B67D 1/001 210/240 |
| 8,064,758 B2 | 11/2011 | Fabrizio | |
| 8,358,922 B2 * | 1/2013 | Stickel | 392/465 |
| 2003/0062364 A1 | 4/2003 | Kikuchi et al. | |
| 2003/0213850 A1 | 11/2003 | Mayer et al. | |
| 2004/0003990 A1 | 1/2004 | Mansur | |
| 2005/0044625 A1 | 3/2005 | Kommers | |
| 2005/0172952 A1 * | 8/2005 | Williams | B01D 1/0017 126/344 |
| 2007/0119309 A1 | 5/2007 | Carrington et al. | |
| 2007/0251261 A1 | 11/2007 | Son et al. | |
| 2008/0087270 A1 | 4/2008 | Shaikh et al. | |
| 2008/0148763 A1 | 6/2008 | Boarman et al. | |
| 2008/0237362 A1 | 10/2008 | Huang | |
| 2009/0039176 A1 | 2/2009 | Davidson et al. | |
| 2009/0154909 A1 | 6/2009 | Meyer | |
| 2009/0230200 A1 | 9/2009 | Kempf et al. | |
| 2009/0249821 A1 | 10/2009 | Zentner et al. | |
| 2009/0289011 A1 | 11/2009 | Avakian | |
| 2010/0096018 A1 * | 4/2010 | Wylie | F24D 17/0078 137/2 |
| 2010/0139779 A1 * | 6/2010 | Lautzenheiser | E03C 1/04 137/14 |
| 2010/0195991 A1 | 8/2010 | Deivasigamani et al. | |
| 2010/0263210 A1 | 10/2010 | Gordon et al. | |
| 2010/0263754 A1 | 10/2010 | Gordon et al. | |
| 2010/0278519 A1 | 11/2010 | Fabrizio | |
| 2010/0282458 A1 | 11/2010 | Ann et al. | |
| 2011/0041243 A1 | 2/2011 | Kwon | |
| 2011/0061608 A1 | 3/2011 | Kim et al. | |

FOREIGN PATENT DOCUMENTS

| | | |
|---|---|---|
| CN | 102107955 | 6/2011 |
| CN | 102107956 | 6/2011 |
| CN | 102107957 | 6/2011 |
| CN | 202007174 | 10/2011 |
| DE | 10 2006 062 352 | 6/2008 |
| GB | 2 038 795 | 7/1980 |
| NL | 102496 | 5/2005 |
| WO | 2004/106246 | 12/2004 |
| WO | 2009/146504 | 12/2009 |
| WO | 2011/030339 | 3/2011 |
| WO | 2011/030340 | 3/2011 |
| WO | 2011/114327 | 9/2011 |
| WO | 2011/145902 | 11/2011 |

* cited by examiner

| CONDITION DETECTED | ELECTROMAGNETIC FIELD STATUS |
| --- | --- |
| WATER IS FLOWING THROUGH THE WATER PURIFIER | ELECTROMAGNETIC FIELD DETECTED |
| WATER IS NOT FLOWING THROUGH THE WATER PURIFIER | NO ELECTROMAGNETIC FIELD DETECTED |
| THE WATER PURIFIER IS OPERATING NORMALLY | ELECTROMAGNETIC FIELD STRENGTH HAS THE FOLLOWING PATTERN: <br> 1) LOW STRENGTH FIELD (CORRESPONDS TO LAMP PREHEAT, WHEN THERE IS 1-2 AMP DC CURRENT DRAW BY THE LAMP); <br> 2) HIGH STRENGTH FIELD (CORRESPONDS TO LAMP STRIKE/IGNITION, WHEN THERE IS 3-8 AMP DC CURRENT DRAW BY THE LAMP); THEN <br> 3) MEDIUM STRENGTH FIELD (CORRESPONDS TO LAMP BEING ON/OPERATING, WHEN THERE IS 2.5-3.5 AMP DC CURRENT DRAW BY THE LAMP) |
| THE WATER PURIFIER LAMP IS BROKEN | ELECTROMAGNETIC FIELD STRENGTH HAS THE FOLLOWING PATTERN: <br> 1) LOW STRENGTH FIELD; <br> 2) HIGH STRENGTH FIELD; THEN <br> 3) NO FIELD |
| THE WATER PURIFIER BALLAST CIRCUIT IS WEAK | ELECTROMAGNETIC FIELD STRENGTH HAS THE FOLLOWING PATTERN: <br> 1) LOW STRENGTH FIELD; <br> 2) LESS THAN HIGH STRENGTH FIELD; THEN <br> 3) NO FIELD |
| THE WATER PURIFIER LAMP IS HARD TO STRIKE/IGNITE | ELECTROMAGNETIC FIELD STRENGTH HAS THE FOLLOWING PATTERN: <br> 1) LOW STRENGTH FIELD; <br> 2) MULTIPLE HIGH STRENGTH PEAKS; THEN <br> 3) MEDIUM STRENGTH FIELD |
| THE WATER PURIFIER LAMP HAS FAILED TO PREHEAT | ELECTROMAGNETIC FIELD STRENGTH HAS THE FOLLOWING PATTERN: <br> 1) NO LOW STRENGTH FIELD; <br> 2) HIGH STRENGTH FIELD; THEN <br> 3) MEDIUM STRENGTH FIELD |
| THE WATER PURIFIER LAMP HAS FAILED TO LIGHT | ELECTROMAGNETIC FIELD STRENGTH HAS THE FOLLOWING PATTERN: <br> 1) LOW STRENGTH FIELD; <br> 2) HIGH STRENGTH FIELD; THEN <br> 3) LOW OR HIGH STRENGTH FIELD |

Fig. 21

SELECTIVE WATER TEMPERATURE COMPONENT FOR USE WITH WATER TREATMENT SYSTEMS

FIELD OF THE INVENTION

The present invention relates to a water heating system, referred to herein as a water temperature component. More particularly, the present invention relates to a water temperature component for a water treatment system and other applications.

BACKGROUND OF THE INVENTION

A variety of water treatment systems exist for the treatment of water for human consumption. According to one such water treatment system, a flow rate of water is filtered and subsequently exposed to germicidal radiation. Filtration of the flow rate removes suspended solids such as sand and dust particles. Germicidal radiation from an ultraviolet light source deactivates harmful microorganisms that escape filtration of the suspended solids. According to this process and other known processes, the flow rate of water is transformed into a potable condition for human consumption and other uses.

In many instances it can be desirable to heat water from a water treatment system. According to one known method, treated water is accumulated in a reservoir and heated according to a batch process. That is, substantially the entire volume of treated water is heated to an elevated temperature before any portion of heated water can be discharged for personal use. While benefiting from its simplicity, the process suffers from a number of shortcomings. For example, the heating of a large volume of water can be energy-inefficient, particularly where less than the entire volume of heated water is desired. Where smaller heating reservoirs are used, the output can be intermittent, largely depending on the speed at which the treated water is heated before being discharged.

Accordingly, there remains a continued need for an improved system and method for heating treated water. In particular, there remains a continued need for an improved water temperature component that is compatible with water treatment systems, the water temperature component being efficient across a wide range of conditions while providing a ready supply of heated water for human consumption and other uses.

SUMMARY OF THE INVENTION

A selective water temperature component is provided. The selective water temperature component includes an inlet connectable to a supply of untreated water, supply and return lines connectable to a water treatment system, and an output for dispensing heated water. The selective water temperature component can be used in combination with a wide range of water treatment systems, including for example point-of-use water purifiers that provide filtration and ultraviolet disinfection.

In one embodiment, the selective water temperature component includes a fluid flow path diverging into first and second channels. The first channel includes a heating element while the second channel bypasses the heating element. Operation of the water temperature component includes selectively directing a flow rate of treated water to the first channel to heat the treated water to one of a plurality of pre-selected temperatures. Heating the treated water can include cycling the power applied to the heating element and/or controlling the flow of treated water through the heating element.

In another embodiment, the selective water temperature component includes an electrical element to supply power to the heating element, a conduit for directing the flow of purified water to the heating element, and a heat sink interposed between the electrical element and the conduit to preheat. The electrical element can include a bidirectional triode thyristor or TRIAC, and the heat sink can include a block formed of a thermally-conductive metallic material. In operation, water flowing through the conduit is pre-heated with heat generated from the TRIAC. The pre-heated water is subsequently heated in the heating element before being discharged from the water temperature component.

In still another embodiment, a cleaning module for the selective water temperature component is provided. The cleaning module includes a housing defining an inlet, an outlet, and a flow path therebetween. The inlet is matable with the water temperature component supply line, and the outlet is matable with the water temperature component return line. The cleaning module additionally includes a cleaning agent within the cleaning module housing. In operation, water is circulated through the cleaning module and into the water temperature component to disperse the cleaning agent within the water heating assembly. The cleaning agent can be an aqueous solution, optionally including citric acid, acetic acid, perchloric acid, peracetic acid, tartaric acid and combinations thereof.

In even another embodiment, the water temperature component includes a backup water reservoir and an internal pump. The backup water reservoir is connected in series between the water temperature component inlet and the water temperature component supply line. In operation, the backup water reservoir and the internal pump maintain a flow rate of untreated water to the supply line when the water pressure at the inlet falls to below a threshold level. The internal pump can additionally maintain the desired volume of water in the backup water reservoir.

In another embodiment, a universal adapter system is provided. The universal adapter system includes multiple interchangeable plug adapters to interface between the water treatment system and the water temperature component. Each of the plug adapters include an electrical socket compatible with a different electrical connector. In addition, the universal adapter system includes an electrical connector to couple the water temperature component to a mains voltage. The electrical connector includes a first end portion for drawing power from a mains outlet, and a second end portion for providing power to the plug adapter and consequently the water treatment system.

In yet another embodiment, the water temperature component includes a dispenser arm. The dispenser arm is rotatable from a retracted position to an extended position for dispensing treated water. In the retracted position the dispenser arm is in abutment with a portion of the water treatment system. The water temperature component additionally includes a quick-release assembly including an ejector for engagement with corresponding push-fit fittings in the water treatment system housing. When the ejector is actuated, the push-fit fittings release the supply and return lines. The water temperature component housing includes a generally concave opening to at least partially receive the water treatment system housing therein.

In even another embodiment, the water temperature component includes a secondary circuit adapted to measure the electromagnetic field strength generated by a primary coil in the water treatment system. The secondary circuit optionally includes a secondary coil, an analog to digital converter electrically connected to the secondary coil, and a controller electrically connected to the analog to digital converter. In operation, the relative strength of the electromagnetic field strength can indicate a flow rate of water in the water treatment system. A change in the electromagnetic field strength can indicate a failure condition, including a pre-heat failure or a strike failure.

Embodiments of the invention can therefore provide a selective water temperature component for use with a water treatment system. The selective water temperature component can heat water from the water treatment system to a user-designated temperature setting, while also providing unheated or ambient water if desired. The selective water temperature component can also include improvements in electrical compatibility, energy consumption, and remote failure detection, for example.

These and other advantages and features of the invention will be more fully understood and appreciated by reference to the description of the current embodiments and the drawings.

BRIEF DESCRIPTION OF THE DRAWINGS

FIG. 21 is a table identifying failure conditions for a water purifier.

DESCRIPTION OF THE CURRENT EMBODIMENTS

The current embodiments relate to a selective water temperature component for heating water from a water treatment system, for example a point-of-use water purifier. For illustrative purposes, the selective water temperature component is shown and described in connection with a point-of-use water purifier disclosed in U.S. Pat. No. 6,451,202 to Kuennen et al, the disclosure of which is incorporated by reference in its entity. Embodiments of the invention can be suitably adapted for a wide range of water treatment systems, however, whether known or hereinafter developed, including water treatment systems having an existing temperature control system.

I. Selective Water Temperature Component Overview

Figure 2:
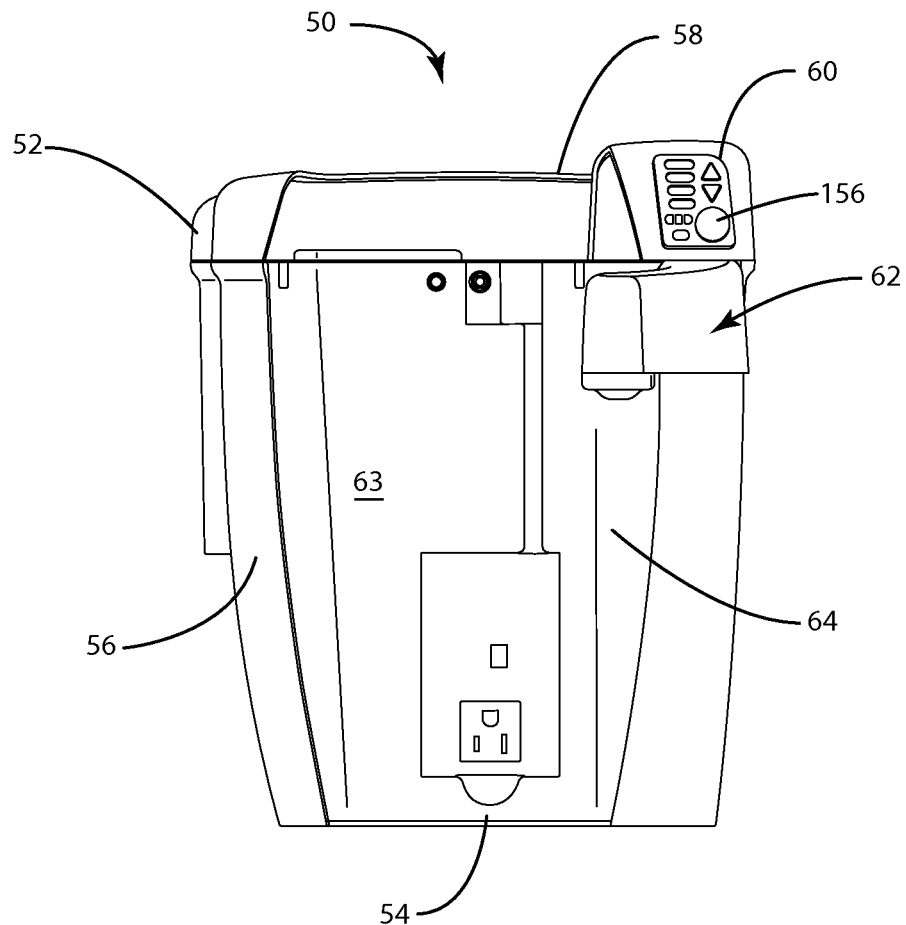
FIG. 2 is an elevation view of the selective water temperature component of FIG. 1.
Figure 3:
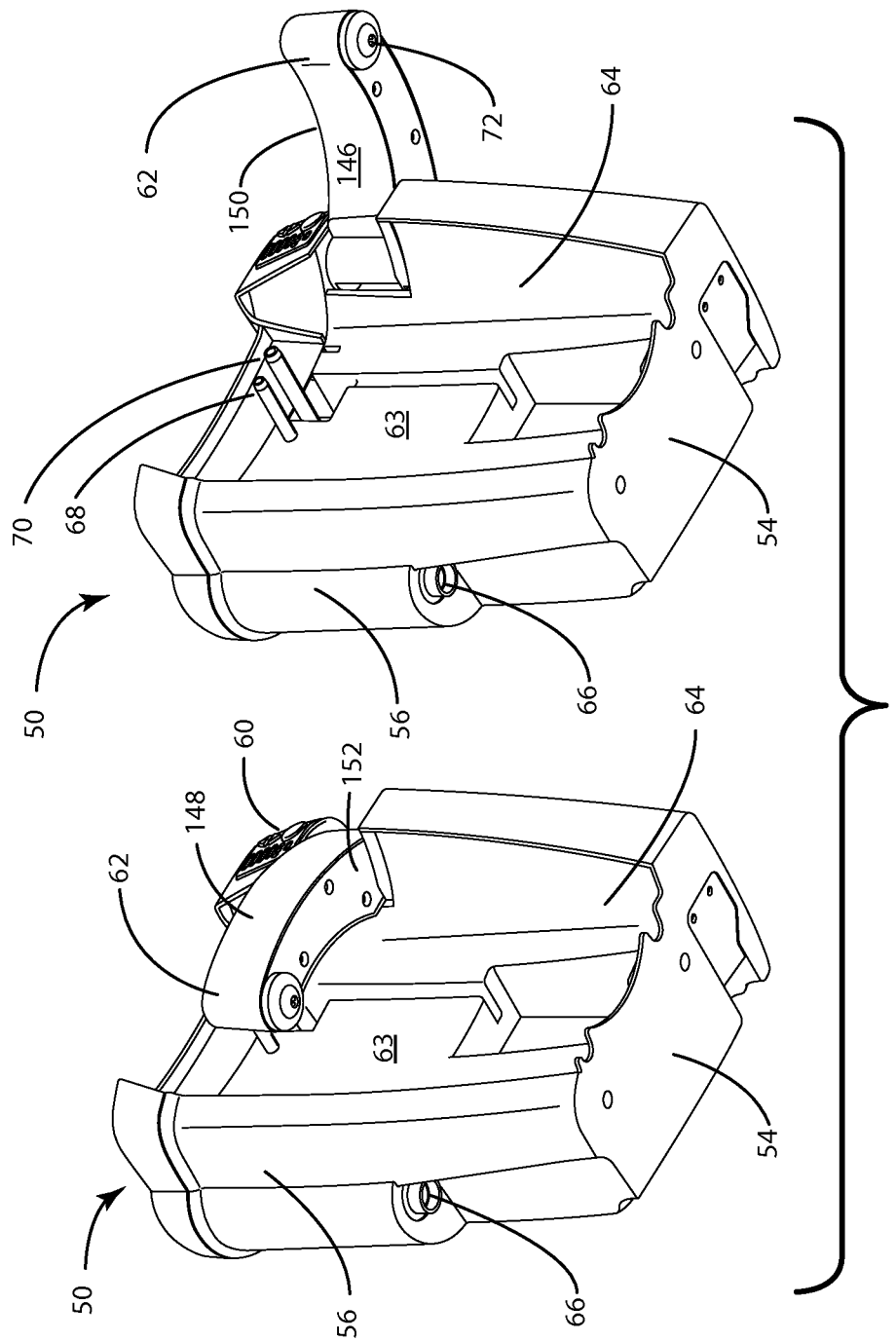
FIG. 3 are bottom perspective views of the selective water temperature component of FIG. 1 illustration rotation of the dispensing arm.
Figure 4:
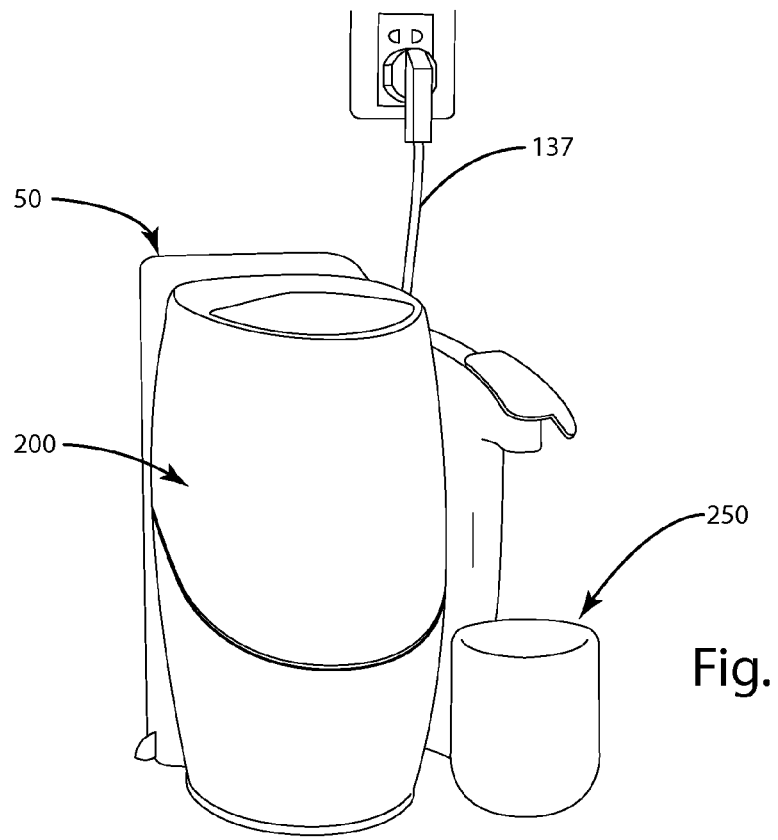
FIG. 4 is a perspective view of a selective water temperature component and water treatment system.
Figure 5:
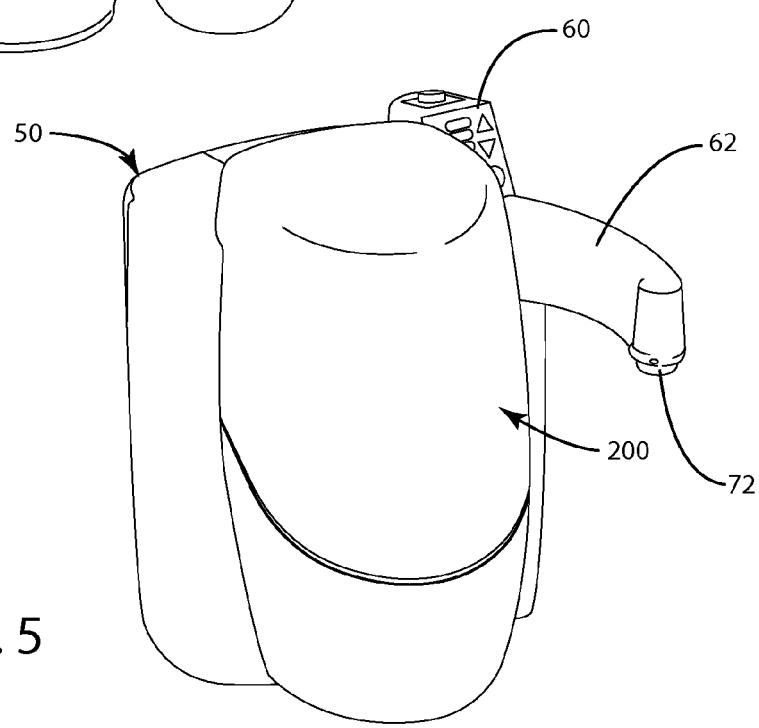
FIG. 5 is a perspective view of a selective water temperature component and water treatment system illustrating the dispenser arm in the extended position.
Figure 6:
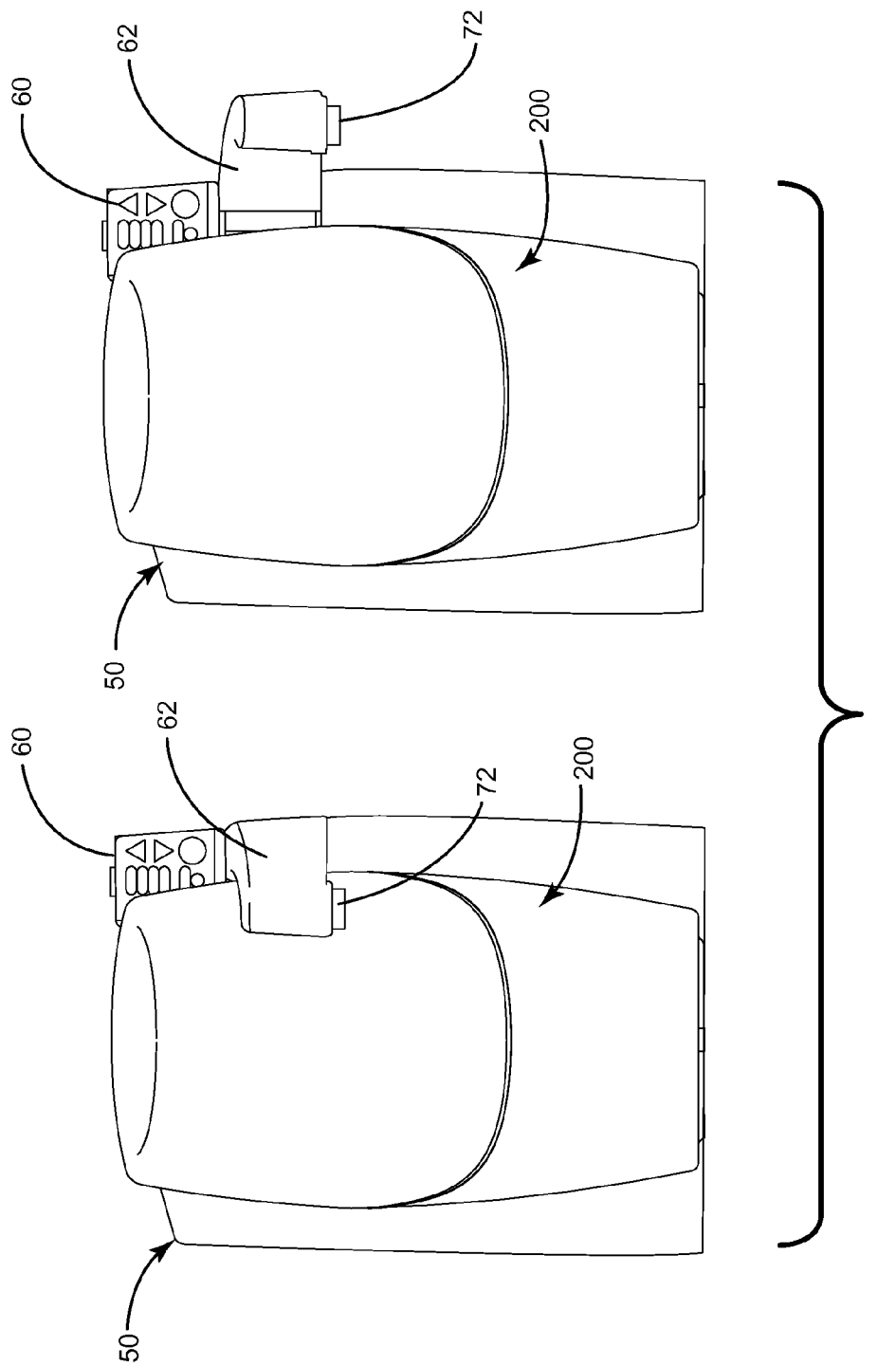
FIG. 6 are elevation views of a selective water temperature component and water treatment system.

Referring now to FIGS. 1-6, a selective water temperature component is illustrated and generally designated 50. The selective water temperature component 50 includes an outer housing 52, for example a rigid housing formed of a thermoplastic or a thermosetting plastic. The housing includes a base 54, multiple upward-extending sidewalls 56, a lid 58 including a control panel 60, and a dispenser arm 62. The forward facing sidewall 63 defines a generally concave opening 64 for receipt of at least a portion of a point-of-use water purifier 200 therein. As shown in FIGS. 4-6 for example, a point-of-use water purifier 200 stands in vertical alignment with the concave opening 64 in the selective water temperature component 50. Collectively, the selective water temperature component 50 and the water purifier 200 can be sized for countertop applications as generally illustrated in FIG. 4, or can be sized for larger or smaller applications as desired.

As also shown in FIG. 3, the selective water temperature component 50 includes an inlet 66 connectable to a source of untreated supply water, a supply line 68 and a return line 70 each being connectable to the water purifier 200, and an outlet 72 in the dispenser arm 62 for dispensing purified or treated water from the selective water temperature component 50. In the illustrated embodiment, the supply line 68 is positioned to the left of the return line 70, while in other embodiments the supply line 68 is positioned to the right of the return line 70. In the embodiment shown in FIG. 3, the inlet 66 includes a downward-facing opening that is connectable to a pressurized water supply. Inlet water is directed to the water purifier 200 through the supply line 68, returning to the selective water temperature component 50 through the return line 70. The supply line 68 and the return line 70 are adjacent one another and are sized and shaped to mate with corresponding connections in the water purifier 200. In the illustrated embodiment, the supply line 68 and the return line 70 extend generally horizontally, or perpendicular to the selective water temperature component sidewall 56. Where desired by the user, an internal heating element heats water that has been treated by the water purifier 200. Once heated, the dispensing arm 62 discharges the heated and treated water from the dispenser arm outlet 72, optionally into a cup, mug or other receptacle 250 as shown in FIG. 4.

Figure 7:
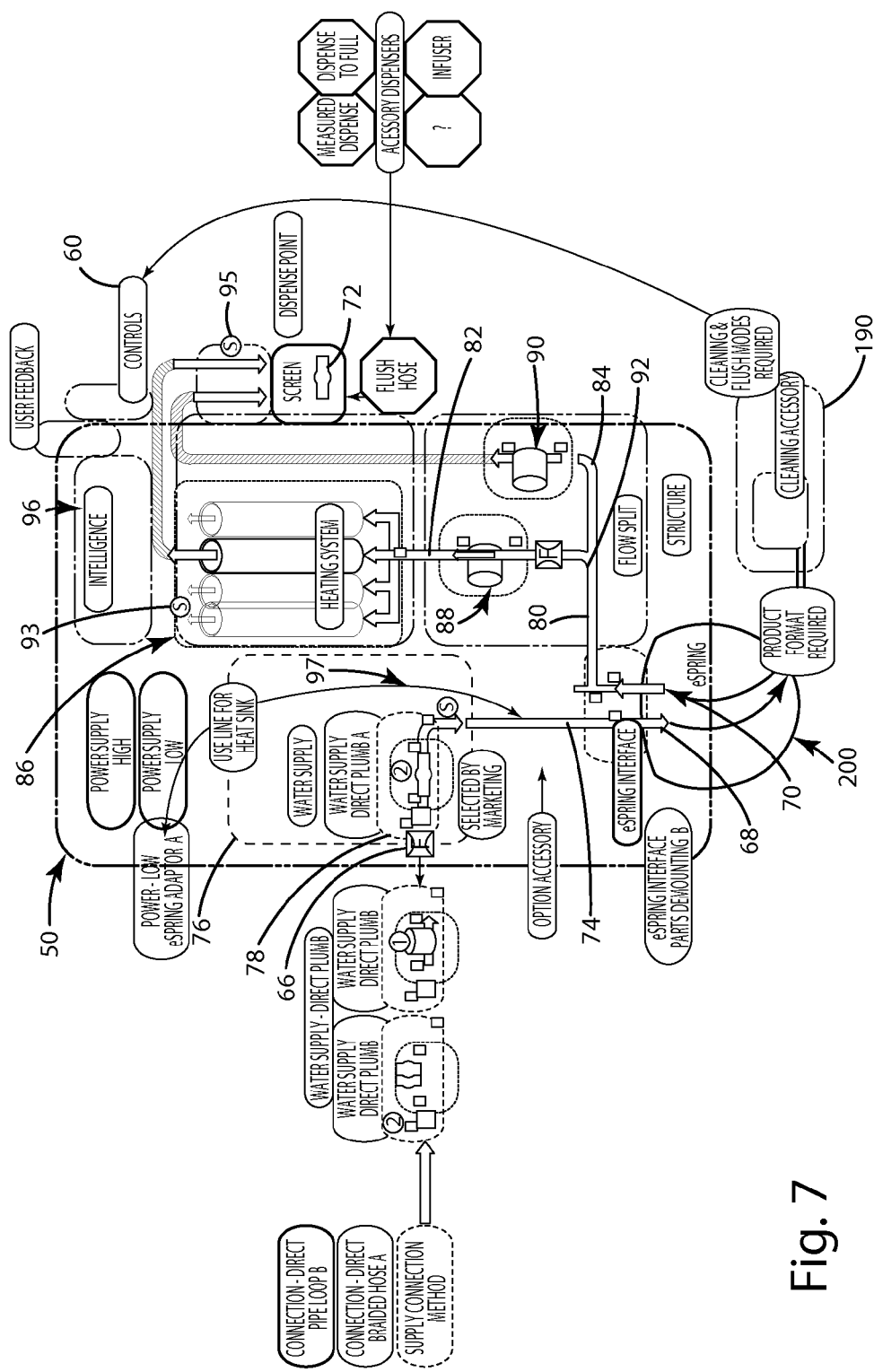
FIG. 7 is a schematic diagram of the selective water temperature component of FIG. 1.

Referring now to FIG. 7, the selective water temperature component 50 includes a pre-treated flow path 74 extending from the inlet 66 to the supply line 68. The pre-treated flow path 74 optionally includes a water reservoir 76 and pump 78 as discussed in greater detail in Part IV below. In instances where the flow rate of pre-treated water into the inlet 66 falls below a threshold level, the pump 78 can maintain a minimum flow rate of pre-treated water from the water reservoir 76 to the supply line 68. Once in the water purifier 200, the water is treated according to any desired method, including for example ultraviolet disinfection, carbon block filtration, ionization, oxidation, chemical water purification, and combinations thereof. Water from the water purifier is then supplied to the return line 70 under inlet pressure or pump pressure for optional heating within the selective water temperature component 50.

As also shown in FIG. 7, the selective water temperature component includes a treated flow path 80 extending from the return line 70 to the dispenser arm outlet 72. The treated flow path 80 splits into first and second channels 82, 84 within the selective water temperature component housing 52. The first channel 82 circulates treated water through a heating element 86 before terminating at the dispenser arm outlet 72, while the second channel 84 bypasses the heating element 86 and terminates at the dispenser arm outlet 72. Though shown as terminating separately, each of the first and second channels 82, 84 can combine in a single flow path to achieve a desired temperature before terminating at the dispenser arm outlet 72. In addition, a valve assembly controls the flow of treated water through the first and second channels 82, 84. As shown in FIG. 7, the valve assembly optionally includes first and second valves 88, 90 downstream of a fork 92 in the treated flow path 80. In this embodiment, the first valve 88 controls the flow of water in the first channel 82, and the second valve 90 controls the flow of water in the second channel 84. The valves can be any device adapted to regulate the flow of fluid. For example, the valves can be two-position solenoid valves, having two ports and two distinct positions, while in other embodiments the valves can include other configurations as desired.

II. Heating Element and Temperature Control

Figure 8:
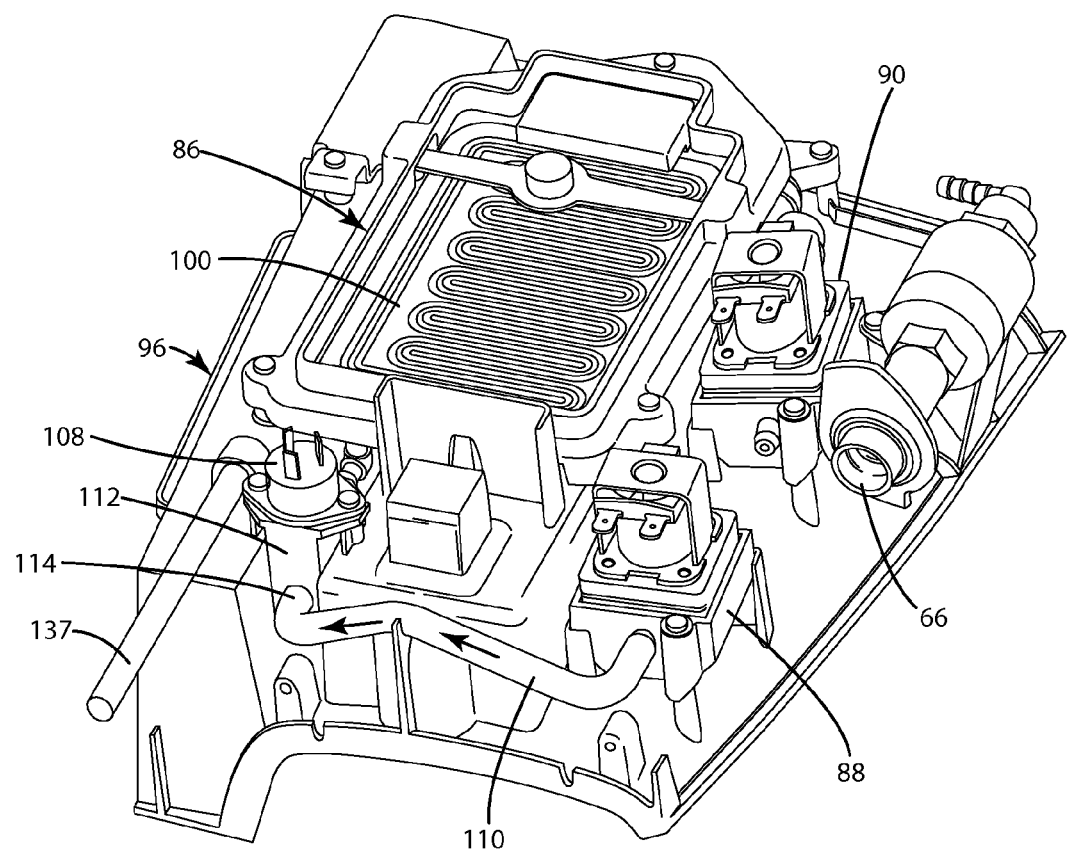
FIG. 8 is a first perspective view of a heating element.
Figure 9:
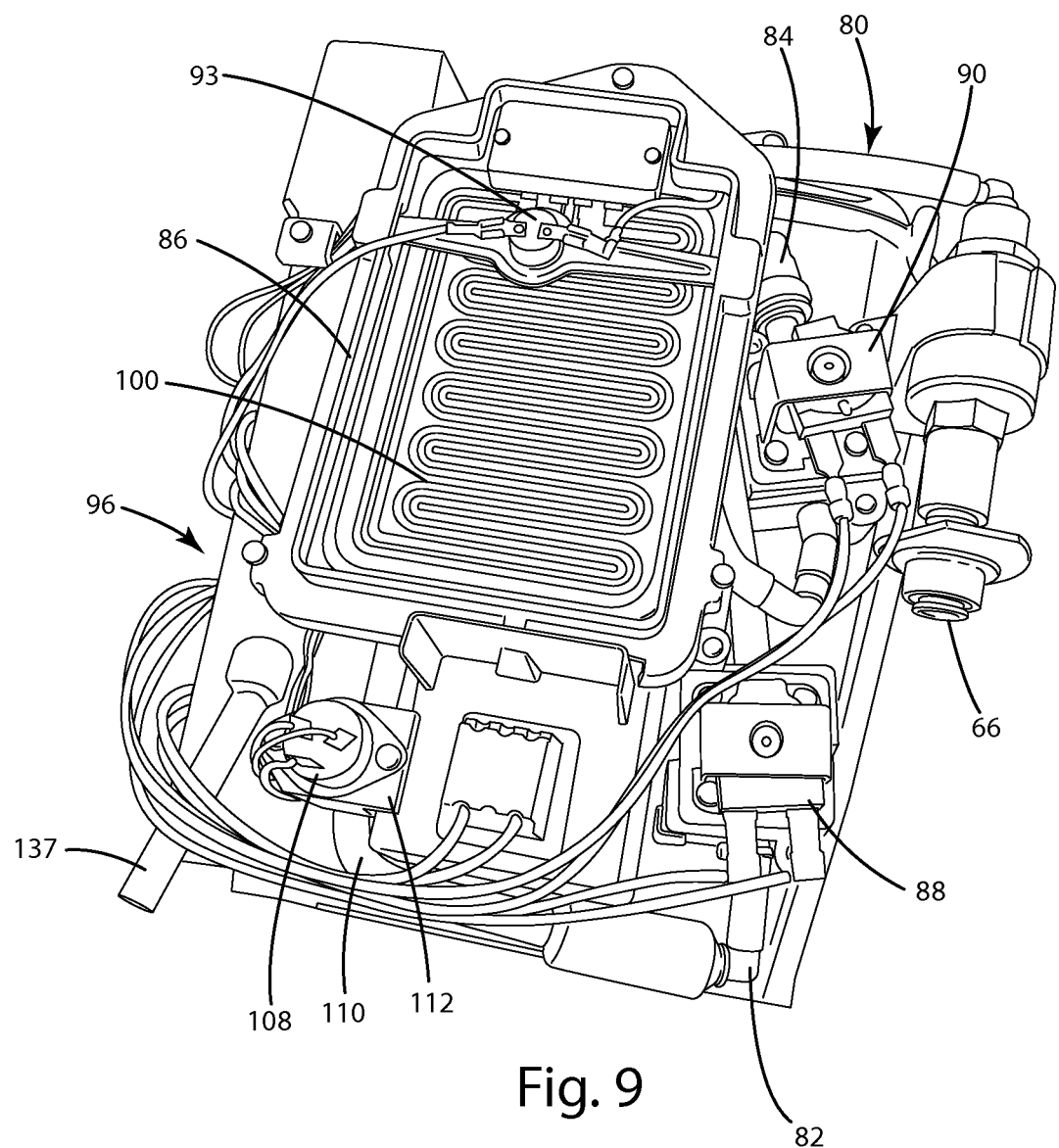
FIG. 9 is a second perspective view of a heating element.
Figure 10:
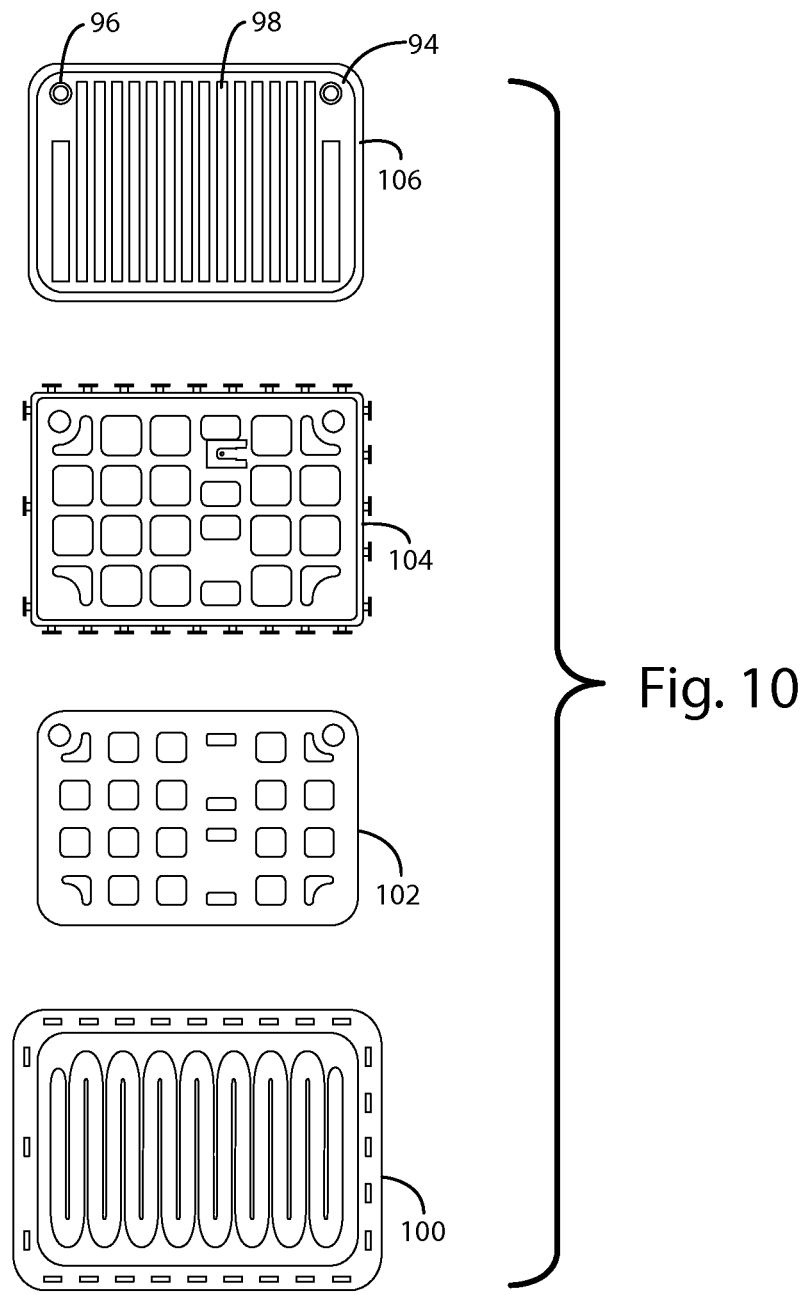
FIG. 10 is an exploded view of a heating element.

As noted above, the heating element 86 is adapted to selectively heat water in the treated flow path 80 when desired by the user. The heating element 86 can be any device adapted to heat a flow rate of fluid, for example treated water. In one embodiment, the heating element 86 includes a flow-through electric water heater, including for example a tankless electric water heater including an internal flow path. In other embodiments, the heating element 86 can include a different configuration as desired. Referring now to FIGS. 8-10, the heating element 86 includes an inlet manifold 94, an outlet manifold 96, a flow-path therebetween 98, and a heating plate 100 in contact with treated water moving through the first channel 82. In the embodiment shown in FIG. 10, a thick film cartridge heating element 86 includes a resistive heating plate 100, a silicone cover 102, a rigid metal housing 104, and a silicone flow guide 106. Water enters the silicone flow guide 106 through the inlet manifold 94, flows through the flow guide 106 in a serpentine pattern, and exits to the remaining portion of the first channel 82 through the outlet manifold 96. Water that has been heated in the heating element 86 is then discharged through the dispenser arm outlet 72. In another embodiment, the heating element 86 includes multiple heating tubes that receive water from an inlet manifold and expel water through an outlet manifold. In this embodiment, the heating tubes are coated with a thin film resistive coating in order to convert electrical energy into heat. The thin film resistive coating can be Indium Tin Oxide (ITO), for example. The heating tubes have a quartz layer that contacts the flowing water, and the resistive coating does not contact the water in the flow path. The heating tubes are uniform in size and resistive coating, such that the heating capacity of each tube is the same.

Figure 11:
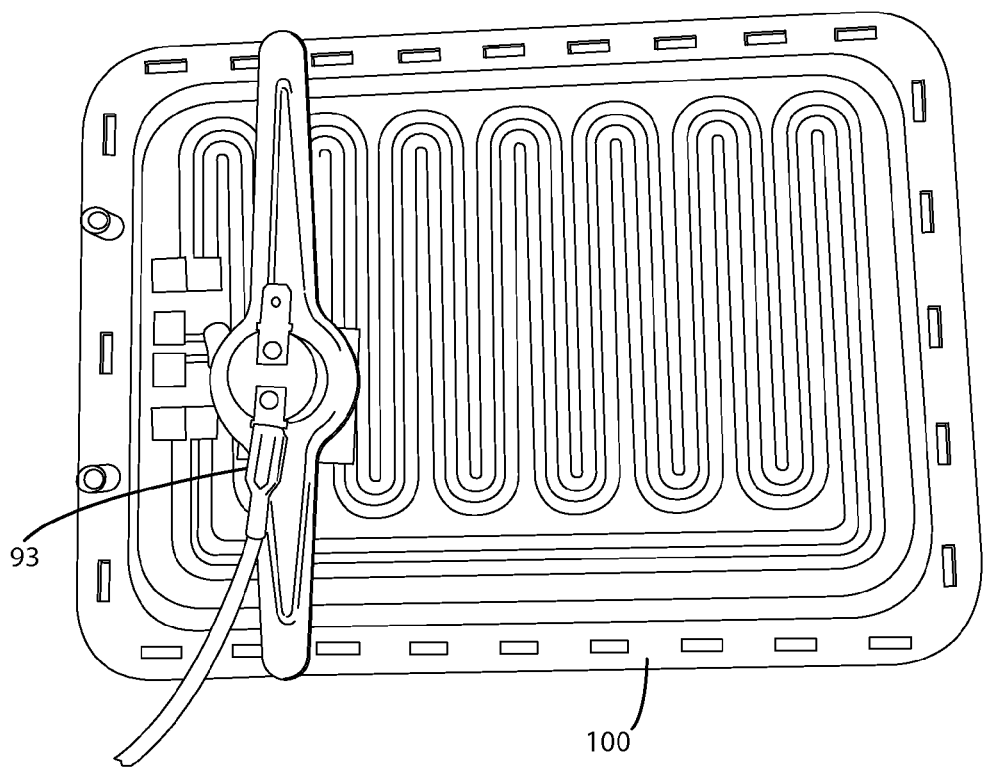
FIG. 11 is a plan view of a heating plate.

The heating element 86 can increase the temperature of water in the treated flow path 80 to one of a plurality of temperatures when desired by the user. For example, the heating element 86 can increase the temperature of water in the treated flow path 87 to about 45° C., about 70° C., and about 90° C. depending on the preference of the user. To achieve the desired temperature increase, the selective water temperature component 50 can control the power applied to the heating element 86 and/or control the flow rate of water through the heating element 86. For example, the selective water temperature component 50 can include one or more temperature sensors 93, 95, 97 to directly or indirectly measure the temperature of water circulating through the treated fluid flow path 80. In the present embodiment, a single temperature sensitive thermostat 93 is located on the heating element 86 outside of the water flow path as best shown in FIG. 11. In other embodiments, multiple temperature sensors can be utilized, including temperature sensors that directly measure the flow of treated water. In another embodiment, a first thermistor 93 is located on the heating element 86 outside the hot water flow path 82 and a second thermistor 95 is located at the dispenser arm outlet 72. The thermistors provide analog inputs to a controller to determine flow controller open/closed state and heater on/off state. An optional third thermistor 97 can be located at the inlet 66 to the selective water temperature component 50 to adjust flow and heating characteristics based on the temperature of the supplied water.

As noted above, the thermostat 93 includes an electrical output, the electrical output being coupled to a controller 96. The controller 96 can include essentially any controller adapted to control operation of the heater element 86. For example, the controller 96 can include a microcontroller, an application specific integrated circuit (ASIC), or a programmable logic controller (PLC). Other controllers can also be utilized where desired. In the present embodiment, the controller 96 compares the temperature sensor output with the user-selected temperature setting. The controller 96 then manipulates one or more external variables to drive the measured temperature(s) toward the user-selected temperature setting. As noted above, the external variables can include the power applied to the heating element, the flow of treated water through the first channel, or both. Other external variables are also possible. This process repeats itself in a closed control loop to provide heated water within an allowed range (e.g., +/−2° C., +/−4° C., +/−6° C.) of the desired temperature.

More particularly, the controller 96 can regulate the electrical power applied to the heating element 86. For example, the controller 96 can periodically interrupt power supplied to the heating element 86 to reduce the thermal output of the heating element 86. This interrupt can be accomplished by reducing the duty cycle of the alternating current being applied to the heating element 86. Where a maximum thermal output is desired, the duty cycle is unity. When a lesser thermal output is desired, the duty cycle is less than unity. A duty cycle less than unity includes an alternating current being delivered in pulses separated by brief periods in which no power is applied to the heating element 86. The controller 96 can also regulate the electrical power applied to the heating element 86 by varying the RMS voltage of the alternating current. For example, where a maximum thermal output is desired, the RMS voltage is equal to that of an input voltage. Where a lesser thermal output is desired, a step-down transformer can reduce the input voltage to a lesser RMS voltage. In these and other configurations, the power applied to the heating element 86 is regulated by the controller 96 to provide a desired thermal output independent of the initial temperature of the treated water.

The controller 96 can additionally regulate the flow of water through the heating element 86. For example, the controller 96 can selectively close the first valve 88 (while the second valve 90 remains closed) to slow or stop the flow rate of treated water moving through the heating element 86. By intermittently closing the first valve 88, or pulsating the flow-rate of treated water, the hot water flow rate is reduced, and treated water is exposed to heat from the heating element 86 for an extended period of time. The controller 96 can continue to cycle the first valve 88 to drive the measured temperature(s) toward the user-selected temperature setting, independent of the initial temperature of the treated water. Throughout this heating process, the second valve 90 can remain closed, such that only heated water is dispensed through the dispenser arm outlet 72. In some embodiments, the above-described valve actuation process is used to supplement the above-described power control process. That is, if the desired thermal output is not achieved with a maximum available power being applied to the heating element 86, the controller 96 will slow or stop the flow of treated water through the heating element until the desired thermal output is attained. In other embodiments, the above-described valve actuation process is used as an alternative to the above-described power control process.

As noted above, the heating element 86 increases the temperature of water moving through the first channel 82. In a further embodiment, the first channel 82 merges with the second channel 84, forming a combined flow path prior to the dispenser arm outlet 72. For example, the first and second channels 82, 84 can combine prior to the dispenser arm outlet 72 to permit heated water in the first channel 82 to intermix with ambient water in the second channel 84. In this embodiment, the dispenser output can achieve a water temperature less than the temperature of water in the first channel 82 but greater than the temperature of water in the second channel 84. The controller 96 can control the water temperature by controlling the proportion of heated water to ambient water, or by controlling the temperature of water in the first channel 84. For example, the controller 96 can increase the water temperature in the combined flow path by increasing the flow-rate through the first valve 88 and/or decreasing the flow-rate through the second valve 90. In like manner, the controller 96 can decrease the water temperature in the combined flow path prior by decreasing the flow-rate through the first valve 88 and increasing the flow-rate through the second valve 90. The controller 96 can additionally increase the temperature of water in the combined flow path by increasing the power applied to the heating element 86, by reducing the flow rate of treated water through the heating element 86, or both.

To reiterate, the selective temperature heating component 50 includes a heating element 86 to heat treated water prior to its discharge from the dispenser arm outlet 72. The treated water can be heated by controlling the power applied to the heating element 86, by controlling the flow rate of treated water through the heating element 86, or both. When a user switches from a higher temperature setting to a lower temperature setting (for example, from near boil to hot or warm, or from hot to warm) dispensed water is supplied from both the heated flow line 82 and the ambient flow line 84 until the water in the heated flow line 82 has cooled to an acceptable temperature. Where water at room temperature is desired, treated water bypasses the heating element 86 and is discharged at the dispenser arm outlet 72.

III. Pre-Heating System

The selective water temperature component 50 can additionally include a pre-heating system. The pre-heating system can pre-heat treated water from the water purifier 200 prior to entering the heating element 86. Referring again to FIGS. 8-9, the pre-heating system includes an electrical element 108 for supplying power to the heating element 86, a conduit 110 for directing the flow of treated water to the heating element 86, and a heat sink 112 between the electrical element 108 and the conduit 110. The electrical element 108 is essentially any electrical element being at least partially resistive. In the present embodiment, the electrical element 108 is a bidirectional triode thyristor, or TRIAC, for providing power to the nearby heating element 86. Other electrical elements can be used in other embodiments as desired.

As also depicted in FIGS. 8-9, the electrical element 108 is supported by and rigidly fixed to the heat sink 112. The heat sink 112 is formed of a block of a thermally-conductive material, for example a metallic material, and further by example aluminum or aluminum alloy. The heat sink 112 includes a first opening 114 and a second opening 116 to define a through-hole therebetween, the conduit 110 extending through the through-hole toward the heater element intake manifold 94. Optionally, the conduit 110 winds or bends within the heat sink 112 to increase the exposure of treated water to heat from the electrical element 108, and to simultaneously cool the electrical element 108.

IV. Water Reservoir

As noted above in connection with FIG. 7, the selective water temperature component 50 can additionally include a water reservoir 76 and a pump 78 connected between the inlet 66 and the water purifier 200. The water reservoir 76 is functionally a backup reservoir, providing a supply of pre-treated water to the water purifier 200 in response to a given criteria. The given criteria can include, for example, the inlet water pressure falling to below a threshold level, or the water purifier flow rate falling to below a threshold level.

Figure 23:
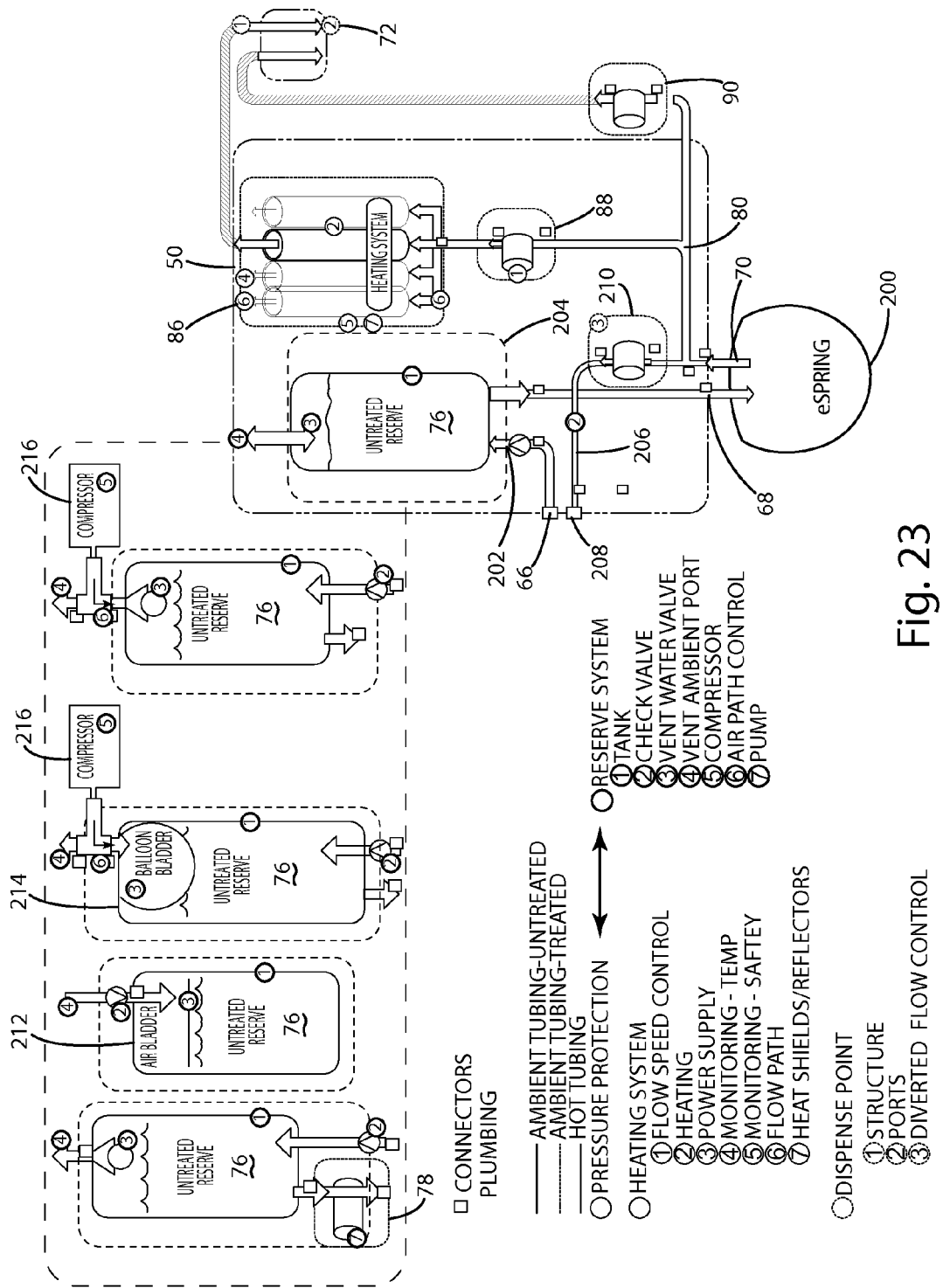
FIG. 23 is a schematic diagram of a selective water temperature component illustrating an internal reservoir and pump system.

As additionally shown in FIG. 23, the reservoir 76 includes an inlet 202 and an outlet 204. The inlet 202 is in fluid communication with the untreated water supply, and the outlet 204 is in fluid communication with the water purifier 200. An auxiliary return flow path 206 branches off of the treated flow path 80. The auxiliary return flow path 206 provides a supply of treated water to an auxiliary outlet 208, which can be used during the 'flush' mode noted in Part IX below. A control valve 210 operates to control the flow of treated water to through the auxiliary return flow path 206, optionally under the control of the controller 96.

A variety of pumps can be used to provide a source of positive or negative pressure to the untreated water in the water reservoir 76. As shown in FIG. 23, the pump 78 can be external to the reservoir 76 and connected between the reservoir outlet 204 and the supply line 68, providing a source of negative pressure. The pump 78 can also be at least partially positioned within the reservoir 76. For example, an air bladder 212 or a balloon bladder 214 (with associated compressor 216) can provide a source of positive pressure from within the reservoir 76. The compressor 216 can provide a source of positive pressure in the absence of an air bladder 212 or balloon bladder 214 by displacing the untreated water from within the reservoir 76. Still other pump assemblies can be used as desired.

In operation, the pump 78, under control of the controller 96, provides positive or negative pressure when the given criteria is triggered. The given criteria can include, for example, the inlet water pressure falling to below a threshold level, or the water purifier flow rate falling to below a threshold level. At all other times, or a sub-portion thereof, the controller 96 can maintain an adequate volume of pre-treated water in the water reservoir 76. As depicted in FIGS. 7 and 23, the water reservoir 76 can be self-contained within the selective water temperature component housing 52. For example, the water reservoir can be opposite of the dispenser arm 62 on a left-hand portion of the housing 52, extending from the base 54 to the lid 58. In the present embodiment the water reservoir 76 provides at least about one half liter of additional capacity, further optionally about one liter of additional capacity. In other embodiments, the water reservoir 76 provides a different capacity if desired.

V. Coupling Assembly and Quick Release

Figure 12:
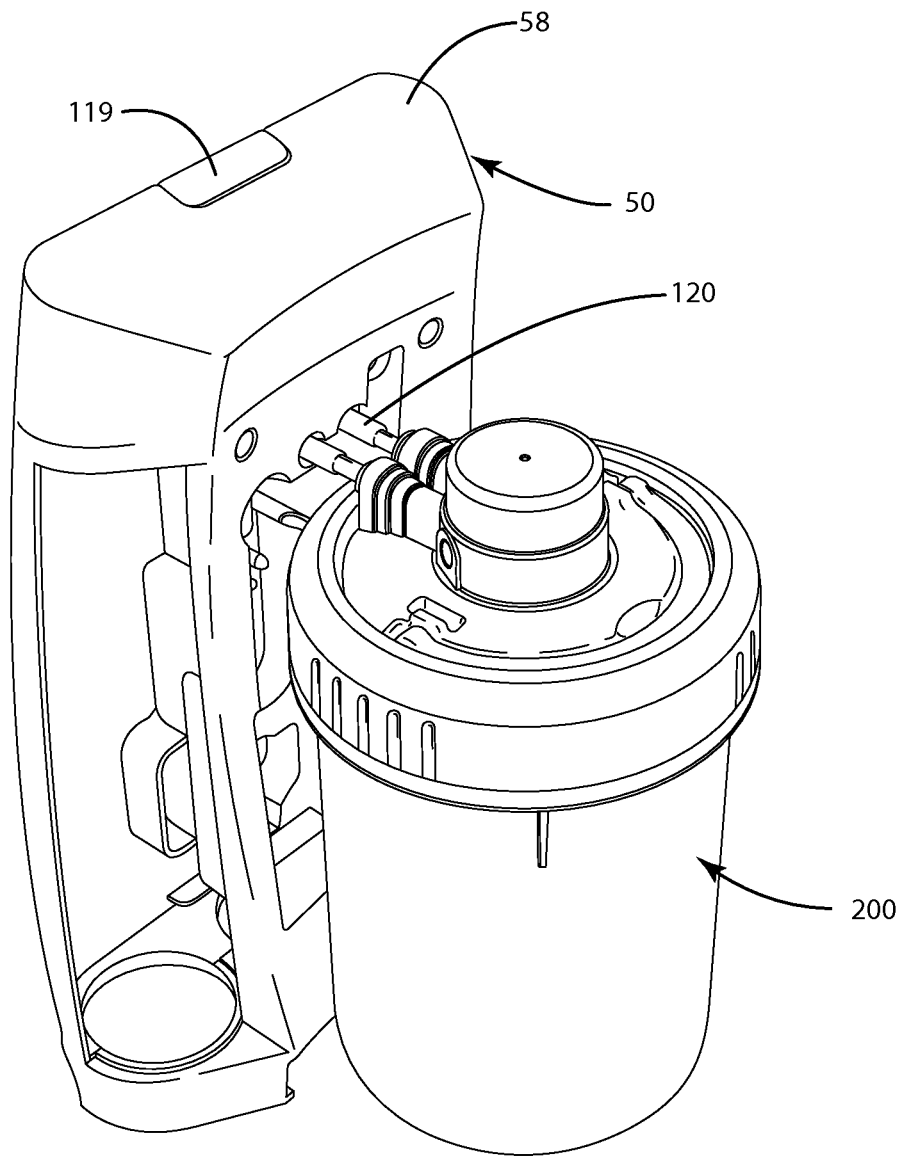
FIG. 12 is a perspective view of a water purifier docked with the selective water temperature component of FIG. 1.
Figure 13:
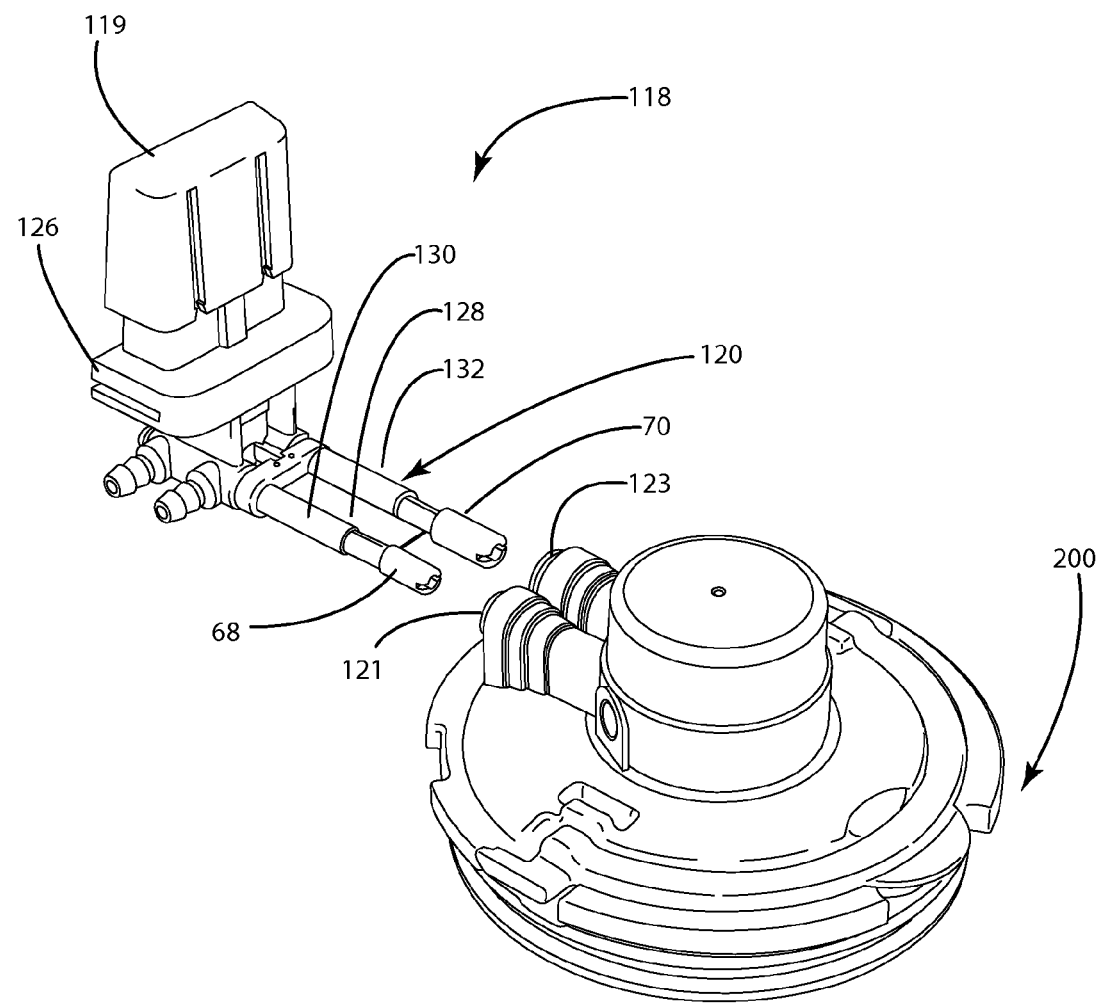
FIG. 13 is a perspective view of an ejector assembly.
Figure 14:
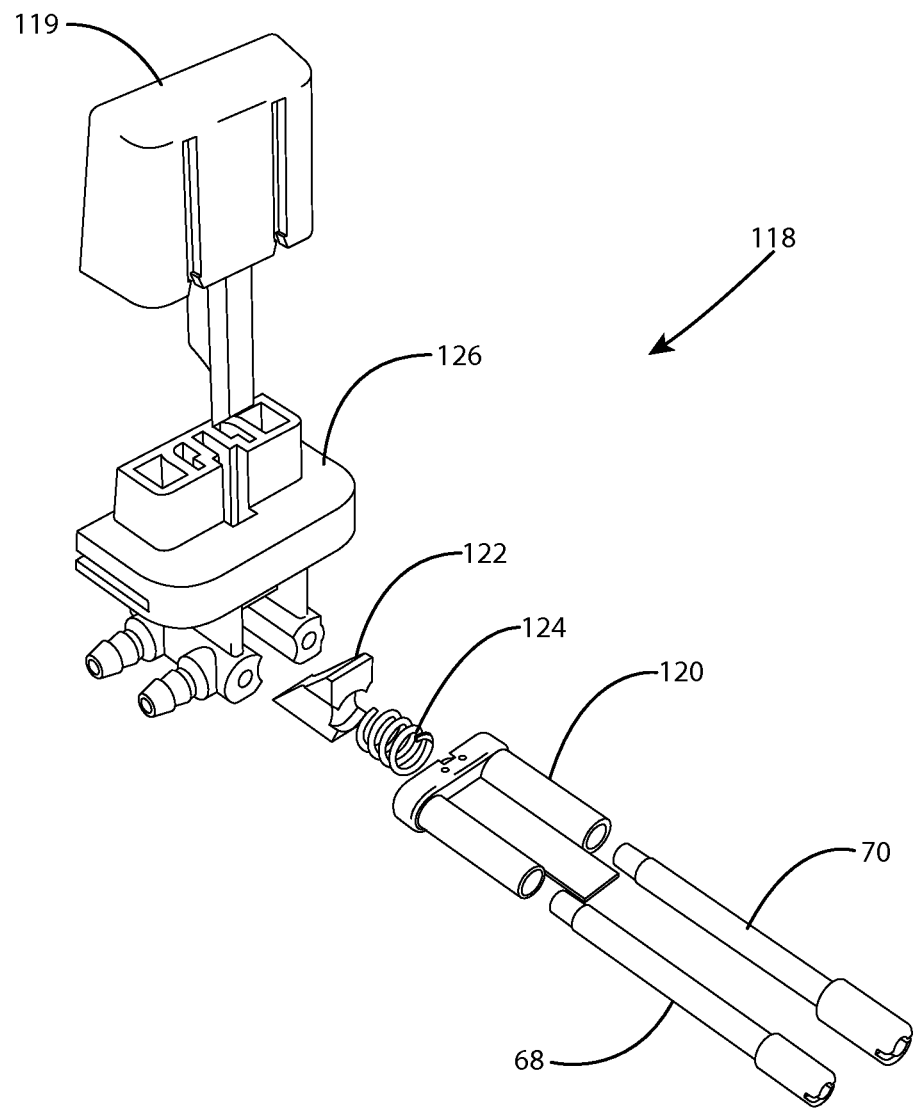
FIG. 14 is an exploded view of the ejector assembly of FIG. 13.
Figure 15:
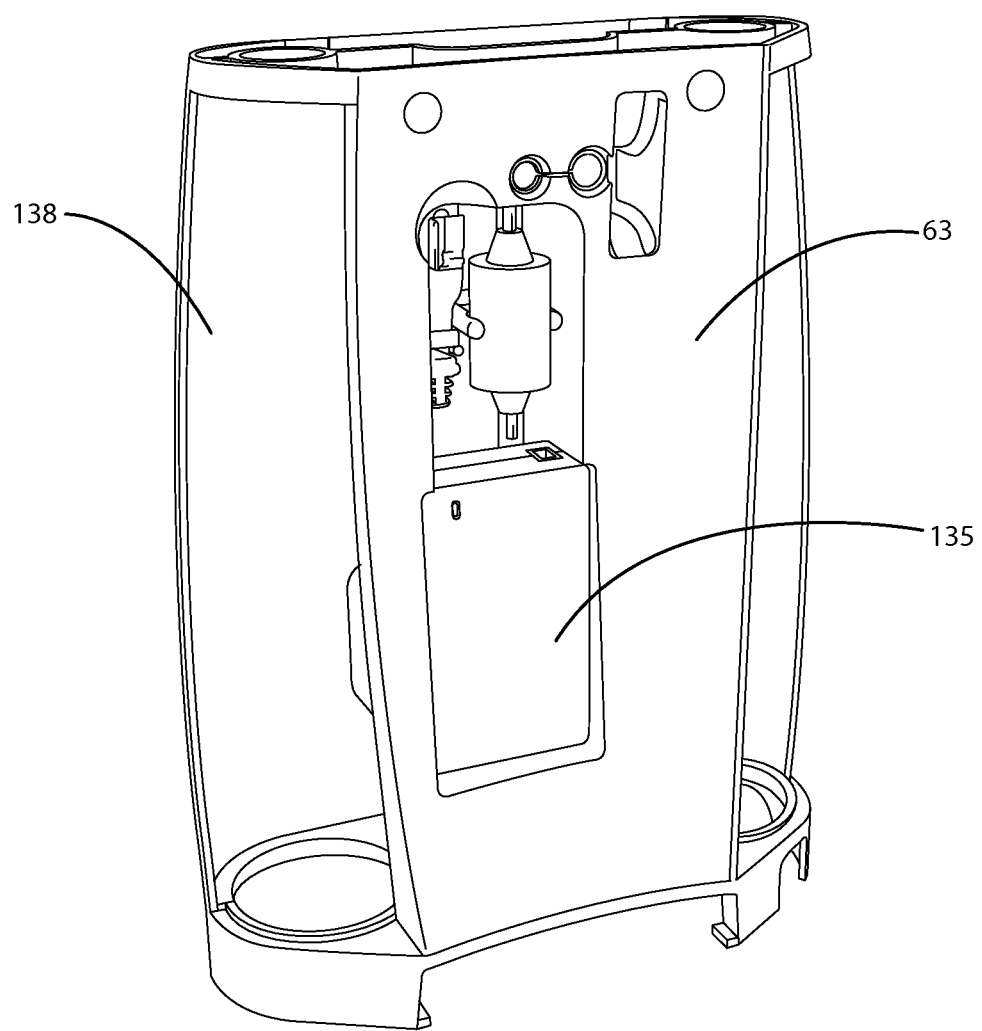
FIG. 15 is a perspective view of an electrical power adapter received within an opening in the selective water temperature component of FIG. 1.
Figure 16:
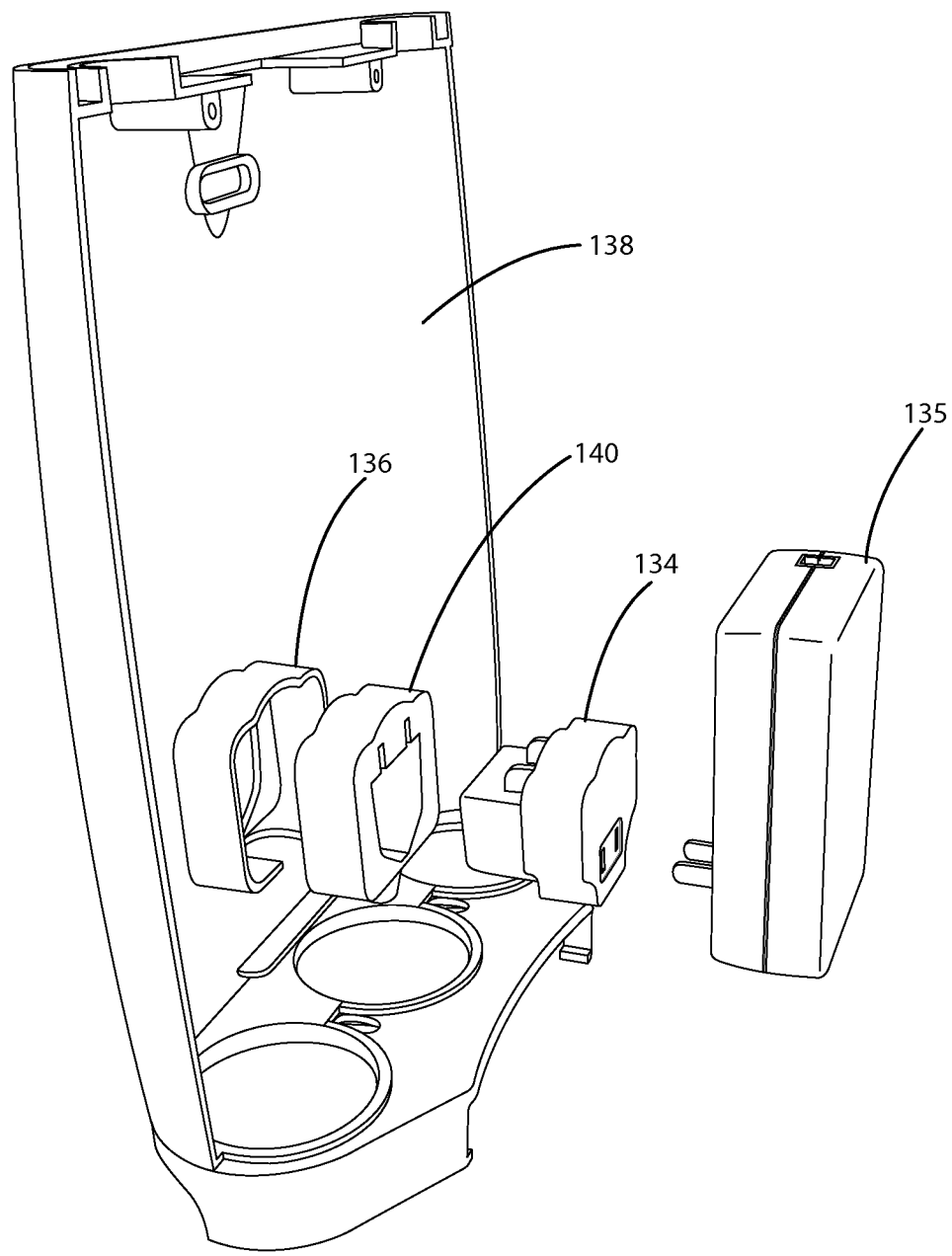
FIG. 16 is an exploded view of a universal plug adapter system.

Referring now to FIGS. 12-14, the selective water temperature component 50 includes a quick release assembly 118 for disengaging the selective water temperature component 50 from the water purifier 200. The quick release assembly 118 includes a push-button 119 and an ejector 120. The push button 119 is flush with the housing 52, and in particular the housing lid 58. The ejector 120 includes an ejector blade 128 extending horizontally between first and second ejector sleeves 130, 132. The quick release assembly 118 also includes an elbow guide 126 to guide vertical movement of the push button 119 and horizontal movement of the ramped member 122.

When downwardly actuated, the push button 119 drives a ramped member 122 forwardly against a compression spring 124. The compression spring, in turn, urges the ejector 120 forward. When the ejector 120 is urged forwardly, the ejector blade 128 releases first and second push-fit fittings 121, 123 associated with the water purifier 200. The push-fit fittings 121, 123 are optionally John Guest (or other half cartridge) fittings that release in response to actuation by the ejector blade 128. As a result, the supply and return lines 68, 70 quickly release from the water purifier 200, which may be removed from the selective water temperature component housing 52. Throughout actuation of the push-button 119, the supply and return lines 68, 70 remain fixed with respect to the elbow guide 126, while the ejector 120 is allowed to move relative to the elbow guide 126 and the supply and return lines 68, 70.

VI. Universal Plug Adapter

Referring now to FIGS. 15-18, the selective water temperature component 50 includes a universal plug adapter system. The universal plug adapter system generally includes a plurality of electrical plug adapters 134. The plurality of electrical plug adapters 134 are adapted to couple a water purifier power adapter 135 to a power board within the selective water temperature component 50. A separate power cord 137 is adapted to couple the power board to a mains voltage.

Figure 18:
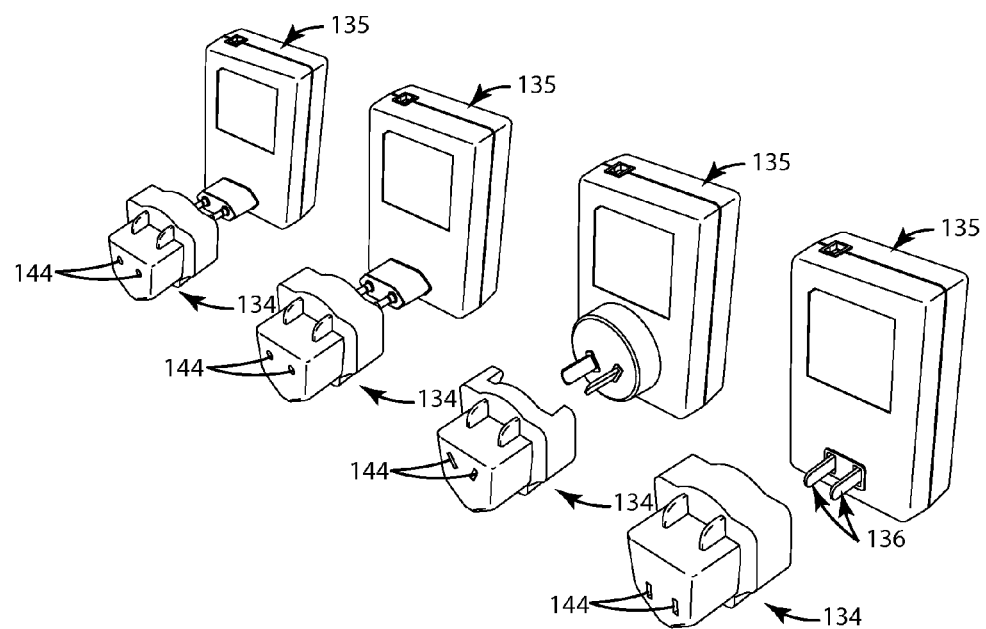
FIG. 18 are second views of the multiple plug adapters of FIG. 17.

The electrical plug adapter 134 is one of a plurality of adapters, each being interchangeable with each other. For example, the selective water temperature component 50 can include four electrical plug adapters 134 as shown in FIG. 18, allowing use in multiple geographic regions each having different standards for plug size, shape, and power rating. More particularly, the electrical plug adapter 134 is retained in an opening 136 in the housing sidewall 138. A spacer 140 is sized to be received between the housing sidewall 138 and the selected electrical plug adapter 134, with both of the spacer 140 and the selected electrical plug adapter 134 being received within the sidewall opening 136.

Figure 17:
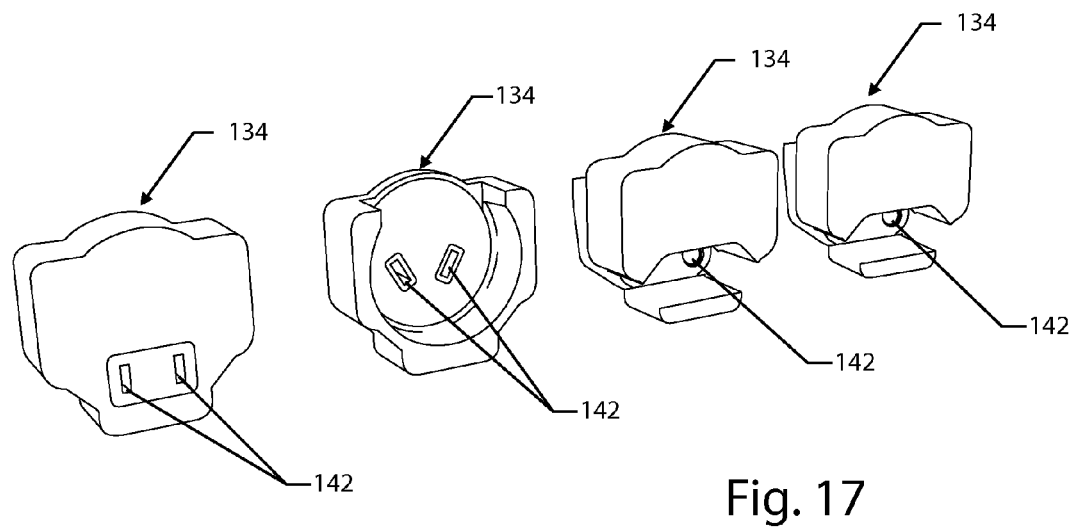
FIG. 17 are first views of multiple plug adapters.

As perhaps best shown in FIG. 17, the electrical plug adapters 134 include a first socket 142 for use in the geographic region in which the water purifier 200 is being used. For example, the first socket 142 can be adapted to receive a two-pronged NEMA connector, a three-pronged Australian/New Zealand connector, or a two-pronged CEE 7/16 Europlug connector. The first socket 142 can be adapted to receive other connectors as desired. The plurality of electrical plug adapters 134 additionally include a second socket 144 opposite of the first socket 142 to receive the male prongs of a power cable. As optionally shown in FIG. 18, the second socket 144 includes the same configuration as the first socket 142. A power cable provides a suitable current or voltage from the internal power board to the desired electrical plug adapter 134.

As shown in FIG. 18, the water purifier 200 includes a power adapter 135. The power adapter 135 supplies electrical power to the water treatment system 200. Because the power adapter 135 includes male prongs 136 corresponding to the geographic region of use, the power adapter 135 is compatible with at least one of the plurality of electrical plug adapters 134. The power cord 137 interconnects the internal power board to a suitable mains voltage as perhaps best shown in FIG. 4. The power cord 137 includes a first end portion having an electrical connector for the given geographic region of use. The power cord 137 includes a second end portion that is coupled to the internal power board. For example, the second end portion can be soldered to the internal power board in some embodiments, while in other embodiments the second end portion includes a propriety electrical connection to a plug on the internal power board.

In operation, the selective water temperature component 50 receives AC power from a wall outlet. The AC line is split into an AC outlet that the water purifier 200 can be plugged into and AC that is used by the selective water temperature component 50. The selective water temperature component 50 uses AC to power the heating element 86 and converts AC to DC and uses the DC to power the control system and the control panel 60.

VII. Dispenser Arm and Control Panel

The dispenser arm 62 is rotatable across a plurality of positions. In a first position as shown at left in FIG. 3, the dispenser arm 62 is retracted to within the generally concave opening 64 for storage or shipping of the selective water temperature component 50. In a second position as shown at left in FIG. 6, the dispenser arm 62 is in abutment with the water purifier 200. In a third position as shown at right in FIGS. 3 and 6, the dispenser arm 62 is in an extended position for dispensing water from the selective water temperature component 50.

The dispenser arm 62 can be shaped to closely correspond to the water purifier 200. For example, the dispenser arm can be arcuate, being rotatable about a vertical axis and including in inner concave surface 146, and outer convex surface 148, and substantially planer top and bottom surfaces 150, 152. When the dispenser arm 62 is in second position, and when the water purifier 200 is docked to the selective water temperature component 50, the inner concave surface 146 conforms or very nearly conforms to the exterior shape of the water purifier 200. In addition, the dispenser arm 62 can extend from an upper portion of the selective water temperature component 50 to accommodate taller water receptacles.

Figure 1:
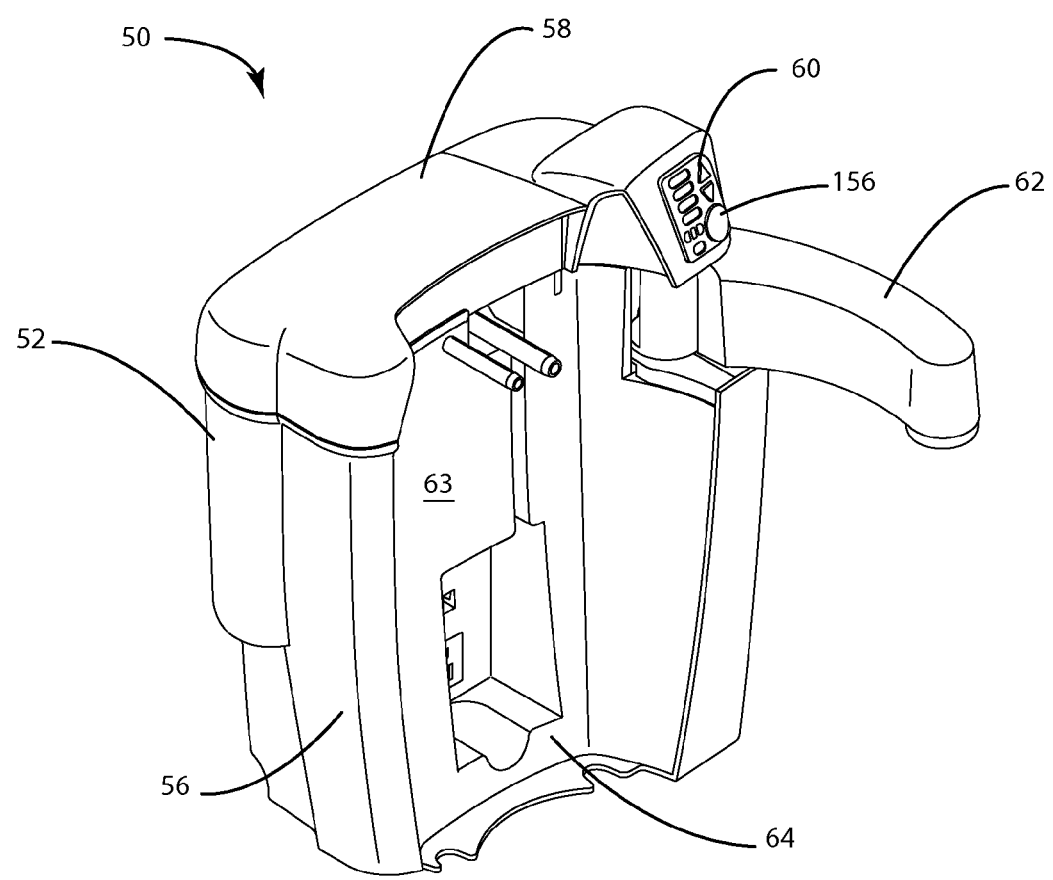
FIG. 1 is a perspective view of a selective water temperature component in accordance with an embodiment of the invention.

As shown in FIGS. 1-3, the selective water temperature component 50 includes a control panel 60 at the upper-right front corner and immediately above the dispenser arm 62. The control panel 60 allows a user to select from a plurality of water temperature settings. In the present embodiment, four water temperature settings are available to the user. In other embodiments, greater or fewer temperature settings are available to the user. The control panel 60 also includes a dispense button 156 that can be depressed to dispense water. The dispense button 156 is illuminated with a color that corresponds to the selected water temperature setting. In addition, the dispense button functionality changes based on the selected water temperature. The below table illustrates exemplary water temperature settings and the corresponding dispense button operation:

| Setting | Water temperature | Dispense button color | Dispense function |
|---|---|---|---|
| Ambient | Water line temperature | Blue | Press button once to start dispensing and once to stop dispensing |
| Warm | 45° C. | Amber | Press button once to start dispensing and once to stop dispensing |
| Hot | 70° C. | Red | Hold down button to dispense |
| Near boil | 90° C. | Red | Hold down button to dispense |

Temperature selection can be achieved using the control panel 60 or other interface with controls that can be manipulated by the user. The controls can include, for example, knobs, sliders, and/or a display with buttons. A display can show information about the selective water temperature component 50, the water purifier 200, and/or the water being dispensed.

VIII. Remote Monitoring

Figure 19:
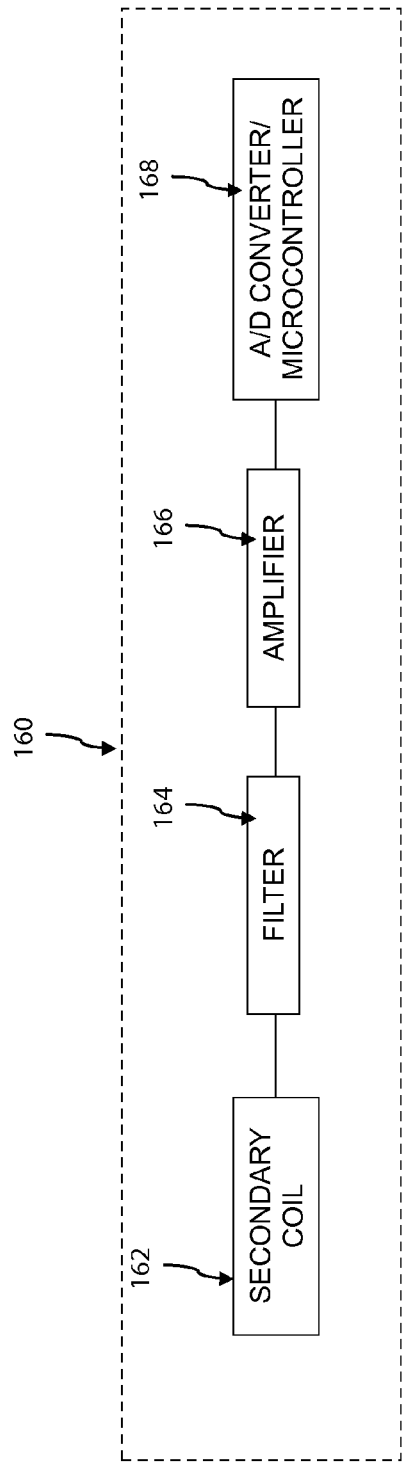
FIG. 19 is a schematic diagram of a secondary circuit.
Figure 20:
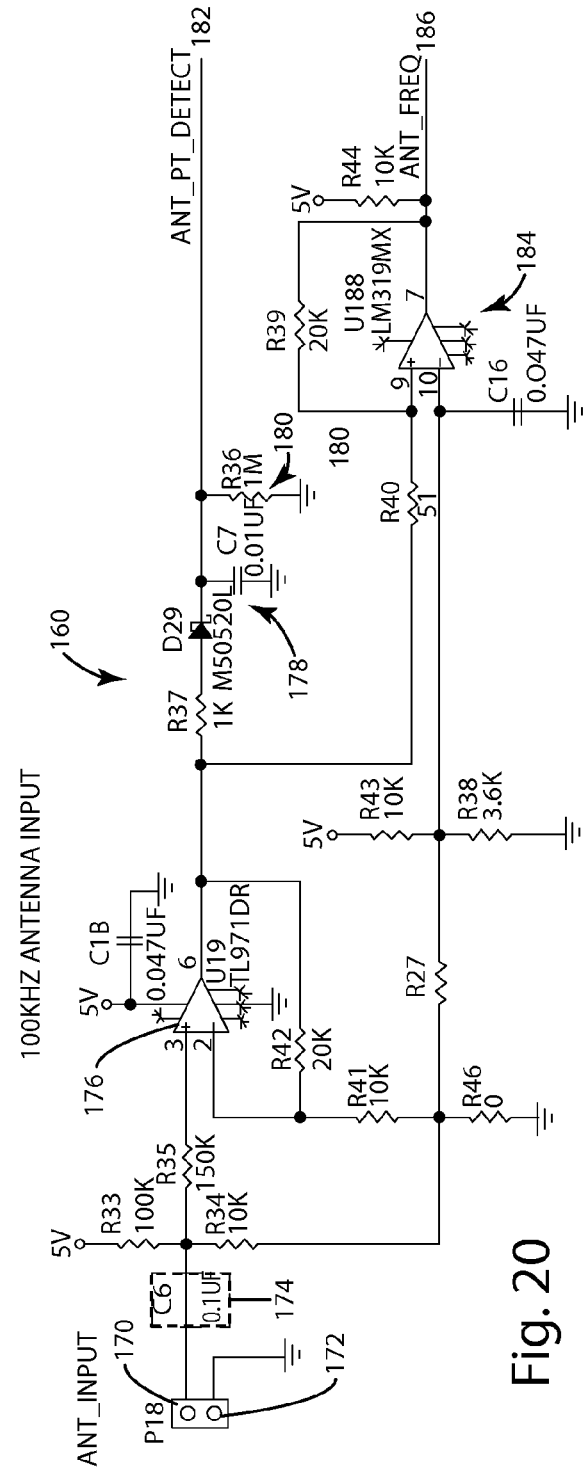
FIG. 20 is a circuit diagram of the secondary circuit of FIG. 19.

Referring now to FIGS. 19-21, the selective water temperature component 50 is adapted to remotely monitor the water purifier 200. More specifically, the selective water temperature component 50 is adapted to detect the electromagnetic field strength generated by a primary coil in applications where the water purifier 200 includes a primary coil. For example, in some embodiments the water purifier 200 will include a primary coil driven with a time-varying current, generating an electromagnetic field. A secondary circuit 160 within the selective water temperature component 50 can measure the electromagnetic field strength to determine one or more failure conditions in the water purifier 200.

More specifically, the water purifier 200 can in some applications include an ultraviolet lamp to irradiate the flow-rate of water circulating through the water purifier 200. In some embodiments, the ultraviolet lamp can include a gas-discharge lamp electrically connected to a secondary coil. A time-varying current in the primary coil can induce a time-varying current in this nearby secondary coil. The operating frequency of this time-varying current is approximately 100 kHz in the present embodiment, while in other embodiments the frequency can differ as desired. The electromagnetic field strength generated by the time-varying current in the primary coil will generally vary across preheat, strike, and steady-state operation of the gas-discharge lamp. Generally, the gas-discharge lamp is driven with a low field strength to preheat the lamp electrodes, a high field strength to strike/ignite the electrodes, and a medium field strength to generate germicidal radiation. The primary coil or a separate RFID reader can operate at a different frequency to read and write data to an RFID tag associated with a filter in the water purifier 200. The RFID frequency is approximately 125 kHz in the present embodiment, while in other embodiments the frequency can differ as desired. The ability to read and write data to the RFID tag can validate the presence of a functioning filter in the water purifier fluid flow path.

With reference to FIG. 19, the selective water temperature component 50 includes a secondary circuit 160 (different from the secondary coil in the ultraviolet lamp) in proximity to the primary coil in the water purifier 200. The secondary circuit 160 can include an inductive secondary 162, a filter 164, an amplifier 166 and a microcontroller 168 having an analog to digital converter. The secondary circuit 160 can monitor frequency and amplitude of the electromagnetic field generated by the water purifier primary coil. In the present embodiment, the inductive secondary 162 includes a wire antenna or a trace antenna in proximity to the water purifier primary coil. An induced voltage (on the order of several millivolts) in the inductive secondary 162 is then amplified using an amplification circuit 166 such as an op-amp and converted to a 0-5V signal. The filter 164, for example a 100 kHz-125 kHz band pass filter, can filter noise from the signal received from the secondary coil prior to being amplified by the amplifier 166. The optional use of two amplifiers allows one amplified signal to be used to charge a capacitor to a level resulting in a peak amplitude signal, while the other amplifier is used directly into the ADC input to a microcontroller at a sufficient sampling rate to measure the intended frequency range. Frequencies on the order of 125 kHz can be considered RFID reading/writing attempts from the water purifier 200, and frequencies on the order of 100 kHz and having higher amplitude values can indicate operation of the water purifier ultraviolet lamp.

A secondary circuit 160 according to one embodiment is illustrated in FIG. 20. The secondary circuit 160 includes two terminals 170, 172 for corresponding end portions of the secondary coil 162, with one terminal tied to ground and the other terminal connected through a high pass filter 174 to a first amplifier 176. The first amplifier 176 operates to amplify the secondary coil output, which is on the order of several millivolts, to a voltage between 0 and 5 volts. The first amplifier output is electrically connected to a sample and hold capacitor 178 and pull down resistor 180. The sample and hold capacitor 178 provides a first analog input 182 to the microcontroller 168, which is optionally the controller 96 noted in Part II above. This first analog input 182, labeled ANT_PK_DETECT, provides a peak voltage between 0 and 5 volts, which is proportional to the electromagnetic field strength of the water purifier primary coil. The first amplifier output is also electrically connected to a second amplifier 184, which is adapted to generate a repeating square wave between 0 and 5 volts and having a frequency corresponding to frequency in the water purifier primary coil. The repeating square wave provides a second analog input 186 to the microcontroller 168, labeled ANT-_FREQ in FIG. 20.

Referring now to the table shown in FIG. 21, the analog inputs 182, 186 to the microcontroller 168 are used to remotely determine and/or discriminate between any number of conditions in the water purifier 200. The left hand column indicates the condition detected by the microcontroller 168, and the right hand column indicates the corresponding characteristics of the analog inputs 182, 186. For example, where no electromagnetic field is detected by the secondary circuit 160, water is determined not to be flowing through the water purifier 200, which energizes the primary coil substantially only in the presence of a fluid flow rate. Where an electromagnetic field is detected by the secondary circuit 160, water is determined to be flowing through the water purifier.

Normal and abnormal operation of the water purifier gas-discharge lamp can also be determined remotely. As also shown in FIG. 21, normal operation of the water purifier gas-discharge lamp typically includes pre-heating of the lamp filaments, strike, and steady-state operation, corresponding to low, high, and medium electromagnetic field strength. The pattern of low, high and medium field strength is evaluated by the microcontroller 168 based on the first analog input 182. In instances where the first analog input does not receive a voltage pattern corresponding to low-high-medium electromagnetic field strength, the microcontroller 168 can diagnose one or more abnormal operating conditions. For example, a low-high field strength followed by substantially no field strength can indicate the ultraviolet lamp is broken. Also by example, a low-high-low field strength can indicate the ultraviolet lamp is functional but weak. In either instance the water being circulated through the water purifier 200 is presumed not to be sufficiently treated. Also shown in FIG. 21, a low-high-medium-medium field strength can indicate the ultraviolet lamp is slow in igniting, and a high-medium field strength can indicate the ultraviolet lamp has failed to preheat properly. Still other failure conditions are possible as illustrated by example in FIG. 21.

A variety of conditions relating to the water purifier filter can also be determined by the secondary circuit 160. In one scenario, the water purifier RFID reader can attempt to read a corresponding RFID tag associated with a water purifier filter. If the RFID reader is unable to validate the presence of an RFID tag, the RFID reader can repeat its read attempts. Each read attempt can be identified by the secondary circuit 160. For example, the secondary circuit 160 can discriminate between a first frequency corresponding to operation of the gas-discharge lamp with a second frequency corresponding to operation of the RFID reader. Were multiple RFID read attempts are detected within a given interval, the microcontroller 168 can interpret the multiple read attempts as indicating a filter deficiency. The filter deficiency can include an improperly installed filter, no filter, an incompatible filter, a counterfeit filter, or other filter deficiency. The selective water temperature component 50 can provide an indication to the user that the water purifier 200 lacks filter functionality, while also terminating the flow of untreated water to the water purifier 200.

To reiterate, the selective hot water component 50 secondary circuit 160 is adapted to measure the relative electromagnetic field strength and operating frequency of the one or more primary coils in the water purifier 200. The electromagnetic field strength and operating frequency can individually or collectively indicate the presence of a flow rate of water through the water purifier. In addition, the electromagnetic field strength and operating frequency can individually or collectively indicate normal or abnormal operation of the ultraviolet lamp assembly or the filter assembly within the water purifier. In the presence of abnormal operating conditions, the microcontroller 168 can halt operation of the selective hot water component 50 until normal operating conditions are realized, or can activate the internal pump 78 if an additional flow-rate of water is desired.

Figure 22:
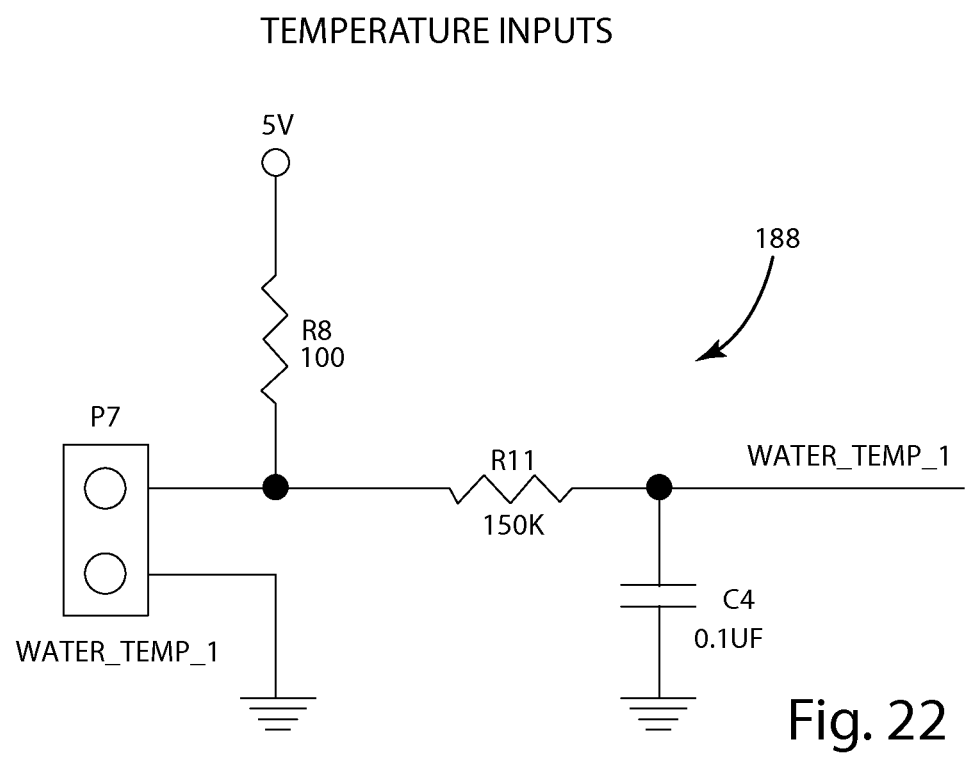
FIG. 22 is a circuit diagram illustrating a voltage divider coupled to a temperature sensor for use with the selective water temperature component of FIG. 1.

Over the useful life of the selective water temperature component 50, it can also be desirable to validate internal operating parameters of the selective water temperature component 50. As noted above, the temperature of water in the treated flow path 74 is monitored using first and second temperature sensors 93, 95. The first and second temperature sensors 93, 95 are thermistors in the present embodiment, being adapted to convert a change in temperature into a change in resistance. A resistive voltage divider 188 converts the resistance into a 0-5 VDC signal, with an exemplary voltage divider shown in FIG. 22. This DC signal is then relayed to the controller 96, optionally having a built in analog-to-digital converter. The resulting numeric value is then matched with a temperature using a look-up table in non-volatile memory. The results of both thermistors 93, 95 can be compared and averaged to within a tolerance of each other. A large discrepancy can result in an error in the system, and the controller can terminate power to the heating element 86 until the discrepancy is resolved.

IX. Self-Cleaning Module and System Flush

Referring now to FIG. 7, a cleaning module 190 for the selective water temperature component 50 is provided. The cleaning module 190 includes a cleaning agent that can be dispersed with the treated water flow path 80 in the selective water temperature component. For example, the cleaning module can include an aqueous cleaning agent. In the present embodiment the aqueous cleaning agent includes citric acid. In other embodiments, a different cleaning agent can be used. For example, the cleaning agent can include acetic acid, perchloric acid, peracetic acid, tartaric acid and combinations thereof. When the water purifier 200 is removed from the selective water temperature component 50, the inlet is matable with the water temperature component supply line 68, and the outlet is matable with the water temperature component return line 70. The cleaning module 190 includes a housing defining an inlet, an outlet, and a flow path therebetween. In operation, water is circulated through the cleaning module 190 and into the selective water temperature component 50 to disperse the cleaning agent within the treated water flow path 80.

The selective water temperature component 50 includes a 'clean' operating mode and a 'flush' operating mode. In the 'clean' operating mode, the water purifier 200 is decoupled from the selective water temperature component 50 as set forth in Part V and replaced with the cleaning module 190. When prompted by the user, the selective water temperature component 50 provides a flow rate of water into the cleaning module 190, thereby dispersing the cleaning agent to within the treated flow path, including both of the first and second channels 82, 84. The selective water temperature component 50 then slows or halts the flow rate of water into the cleaning module for a predetermined cleaning period. During this cleaning period, the cleaning agent is permitted to remain stationary within the treated fluid flow path 80. After the cleaning period has lapsed, the selective water temperature component 50 resumes the flow rate of water through the cleaning module 190 and into the treated fluid flow path 80 until substantially all of the cleaning agent is depleted from the cleaning module 190 and discharged from the treated fluid flow path 80. Once these conditions are met, the user can de-couple the cleaning module 190 and re-couple the water purifier 200 to the selective water temperature component 50 for normal operation.

As noted above, the selective water temperature component 50 includes a 'flush' operating mode. A 'flush' operating mode can be desired to remove suspended contaminants or non-potable fluids from either of the water purifier 200 or the selective water temperature component 50. For example, it can be beneficial to flush the water purifier 200 for a predetermined period to remove carbon fines from the fluid flow path 80 after a change in carbon block filters. It can also be beneficial to flush the selective water temperature component 50 to purge any residual cleaning agents after the above described 'clean' operating mode. Like the 'clean' operating mode, the 'flush' operating mode can include providing a flow rate through both of the first and second channels 82, 84 of the treated flow path 80. In addition, both of the 'clean' and 'flush' operating modes can be user initiated or automatically initiated, provided of course the user has placed a suitably sized receptacle below the dispenser arm outlet 72.

X. Conclusion

The above embodiments relate to a selective water temperature component for heating water from a point-of-use water treatment system. These embodiments can be suitably adapted for a wide range of water treatment systems, including water treatment systems having an existing temperature control system. While being described as relating to water for human consumption, embodiments of the invention can also relate to other fluids and for other purposes. In addition, the above described features of the present invention can be used collectively in some embodiments, while in other embodiments only a subset of the above features can be utilized.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A heating system for use with a portable water treatment assembly, the heating system comprising:
   a heating system housing including:
      an inlet connectable to a source of pretreated water, and
      an adapter including a supply line and a return line each being connectable to the water treatment assembly; and
   a dispenser arm including an outlet to dispense treated water from the heating system, the dispenser arm being rotatable relative to the heating system from a first stationary position for dispensing purified water to a second stationary position in abutment with the water treatment assembly.

2. The heating system of claim 1 wherein the heating system includes an ejector extending from a forward facing sidewall for engagement with a corresponding push-fit fitting in the water treatment system.

3. The heating system of claim 1 wherein the dispenser arm is rotatable about a substantially vertical axis of rotation.

4. The heating system of claim 1 wherein the heating system housing includes a generally concave opening to at least partially receive the water treatment assembly therein.

5. The heating system of claim 4 wherein the dispenser arm is rotatable to a third stationary position at least partially within the generally concave opening for storage of the heating system.

6. The heating system of claim 1 wherein the dispenser arm includes a nozzle adapter for coupling to one of a plurality of nozzle outlets.

7. A heating system for use with a portable water treatment assembly including a primal coil, the heating system comprising:
   a heating system housing including:
      an inlet connectable to a source of pretreated water, and
      an adapter including a supply line and a return line each being connectable to the water treatment assembly; and
   a secondary circuit within the heating system housing adapted to measure the electromagnetic field strength generated by the water treatment assembly primary coil.

8. The heating system of claim 7 wherein the secondary circuit includes:
   a secondary coil;
   an analog to digital converter electrically connected to the secondary coil; and
   a controller electrically connected to the analog to digital converter.

9. The heating system of claim 8 wherein the controller is adapted to determine a flow rate of water through the water treatment system based on the current or voltage generated in the secondary coil.

10. The heating system of claim 8 wherein the controller is adapted to determine the presence of a failure condition in the portable water treatment system based on the current or voltage generated in the secondary coil.

11. The heating system of claim 8 wherein the controller is adapted to determine the presence of a failure condition in the portable water treatment system based on a change in the current or voltage generated in the secondary coil.

12. The heating system of claim 11 wherein the primary coil is adapted to provide a source of wireless power to an ultraviolet light source within the water treatment system, the failure condition indicating a failure of the light source to strike.

13. The heating system of claim 11 wherein the primary coil is adapted to provide a source of wireless power to an ultraviolet light source within the water treatment system, the failure condition indicating a failure of the light source to preheat.

14. The heating system of claim 11 wherein the primary coil is adapted to provide a source of wireless power to an ultraviolet light source within the water treatment system, the failure condition indicating a failure of the light source to provide a predetermined luminary output.

15. The heating system of claim 7 further including a heating element in fluid communication with the return line to heat treated water to one of a plurality of predetermined temperature settings selectable by a user.

* * * * *